United States Patent [19]
Wells et al.

[11] Patent Number: 5,253,339
[45] Date of Patent: Oct. 12, 1993

[54] METHOD AND APPARATUS FOR ADAPTIVE PHONG SHADING

[75] Inventors: Stuart Wells, Sunnyvale; James Van Loo, Los Altos; Jack R. McKeown, Cupertino; Mukund Bhakta, San Jose, all of Calif.

[73] Assignee: Sun Microsystems, Inc., Mountain View, Calif.

[21] Appl. No.: 560,869

[22] Filed: Jul. 26, 1990

[51] Int. Cl.$^5$ .............................................. G06F 15/72
[52] U.S. Cl. ................................... 395/126; 395/131; 395/132
[58] Field of Search ................ 395/126, 128, 131, 132

[56] References Cited

U.S. PATENT DOCUMENTS

| | | | |
|---|---|---|---|
| 4,805,116 | 2/1989 | Laing et al. | 395/129 |
| 4,866,637 | 9/1989 | Gonzalez-Lopez et al. | 395/126 |
| 4,912,659 | 3/1990 | Liang | 395/126 X |
| 4,994,989 | 2/1991 | Usami et al. | 395/131 X |
| 5,031,117 | 7/1991 | Minor et al. | 395/131 |
| 5,142,617 | 8/1992 | Dalrymple et al. | 395/132 |
| 5,163,126 | 11/1992 | Einkauf et al. | 395/126 X |

FOREIGN PATENT DOCUMENTS

| | | | |
|---|---|---|---|
| 0259971 | 8/1987 | European Pat. Off. | |
| 60-217461 | 10/1985 | Japan | 395/128 |
| 89/01206 | 7/1988 | World Int. Prop. O. | |

*Primary Examiner*—Mark K. Zimmerman
*Attorney, Agent, or Firm*—Blakely Sokoloff Taylor & Zafman

[57] ABSTRACT

An adaptive shading method is utilized to generate shaded images in real time. The technique to shade the image is determined according to the curvature of the surface, the variation of the light vector across the surface, and the variation of the eye vector across the surface. The color or intensity is first computed at each of the vertices of the polygon. A series of tests are then performed to determine the order equation that is to be used to interpolate the color or intensity across the polygon between the vertices. Using this technique, polygons having a slight or no curvature and an infinite light source (thus being the simplest form of shading), will use an extremely fast, low order equation to interpolate across the polygon. Polygons, having a high degree of curvature and/or positional light source will utilize, as necessary, a higher order equation which requires additional computation time but produces desirable shading results.

73 Claims, 16 Drawing Sheets

| METHOD USED | SPECULAR POWER | THRESHOLD | RENDER TIME | NMSE | COMMENT |
|---|---|---|---|---|---|
| PHONG (2ND ORDER) | ALL | NA | 4'16" | NA | |
| GOURAUD (1ST ORDER) | ALL | NA | 1'7" | NA | |
| ADAPTIVE SHADING | 1 | 0.6 | 3'4" | 0.000061 | PERFECT |
| | 1 | 0.7 | 2'46" | 0.000158 | EXCELLENT |
| | 1 | 0.8 | 2'27" | 0.000239 | VERY GOOD |
| | 1 | 0.9 | 1'59" | 0.000464 | ACCEPTABLE |
| | 1 | 0.99 | 1'7" | 0.001068 | POOR |
| | 10 | 0.6 | 3'5" | 0.000052 | PERFECT |
| | 10 | 0.7 | 2'45" | 0.000122 | EXCELLENT |
| | 10 | 0.8 | 2'26" | 0.000164 | VERY GOOD |
| | 10 | 0.9 | 2'0" | 0.000359 | ACCEPTABLE |
| | 50 | 0.5 | 3'19" | 0.000060 | PERFECT |
| | 50 | 0.7 | 2'46" | 0.001062 | EXCELLENT |
| | 50 | 0.8 | 2'26" | 0.000220 | VERY GOOD |
| | 50 | 0.9 | 1'58" | 0.000415 | ACCEPTABLE |

*Figure 9*

METHOD AND APPARATUS FOR ADAPTIVE PHONG SHADING

BACKGROUND OF THE INVENTION

1. Field of the Invention:

The method and apparatus of the present invention is related to the field of the generation of computer generated images. In particular, the method and apparatus of the present invention is related to the shading of computer generated images.

2. Art Background:

Typically, in a computer graphics system which generates digital images, the surfaces of objects are represented as a mesh of planar polygons. These polygons can be transformed and rendered quickly using well-known techniques. The techniques assume the input to be a simple triangle where the vertex attributes are position, normal and color as illustrated in FIG. 1a. The vertex position is defined, for example, in the object coordinate space. The vertex normals are unit vectors which describe the the surface orientation at each vertex. The vertex color specifies the intrinsic color of the object. The vertex color attribute allows the object color to vary across the triangle.

In order to generate a realistic image of an object on a computer graphics display, not only must the shape of the object be generated but the shading of the visible surfaces of the object must be included, taking into account the light sources, surface characteristics and the positions and orientations of the surfaces and sources. A combination of three reflection functions may be used to determine the shading of an image. Those three reflection functions are ambient reflection, diffuse reflection and specular reflection. Ambient reflection is the light which the object absorbs, then radiates, from random light sources. There is no dependence on light direction. The ambient function simply scales the object color. For example, for the ambient weights for red, green and blue, $Ka_r$, $Ka_g$, $Ka_b$, the function of ambient reflection may be described as:

$$Ia_r = Ka_r * C_r$$

$$Ia_g = Ka_g * C_g$$

$$Ia_b = Ka_b * C_b$$

where $Ia_r$, $Ia_g$, $Ia_b$ respectively are the ambient reflection for the red, green and blue color elements, $Ka_r$, $Ka_g$, $Ka_b$ are the ambient weights for the color elements red, green and blue and $C_r$, $C_g$, $C_b$ are the object color or color intensities for the red, green and blue elements of the object. The range of the ambient weights is:

$$0 \leq Ka_r \leq 1, 0 \leq Ka_g \leq 1, 0 \leq Ka_b \leq 1.$$

It should be noted that the ambient weights, $Ka_r$, $Ka_g$, $Ka_b$, and the diffuse weights, $Kd_r$, $Kd_g$, $Kd_b$ below are, in fact, the product of two terms. The first term expresses the light intensity for the component. The second term expresses the ability of the object surface to reflect this component. Since neither depends on the scene geometry, the discussion combines the two terms into the weights. If the scene includes multiple light sources, there would be separate weights for each light source.

Dull, matted surfaces exhibit diffuse reflections, scattering light equally in all directions so that surfaces appear to have the same brightness from all viewing angles. For such surfaces, Lambert's cosine law relates the amount of reflected light to the cosine of the angle $\alpha$ between the direction L to the point light source, and the normal vector N to the surface as is illustrated in FIG. 1b. The diffuse reflection may be represented by the following equation:

$$Id_r = \cos(\alpha) * Kd_r * C_r$$

$$Id_g = \cos(\alpha) * Kd_g * C_g$$

$$Id_b = \cos(\alpha) * Kd_b * C_b$$

where $\cos(\alpha)$ equals $N \cdot L$ (Since the diffuse reflection must be positive, the calculation of the $\cos(\alpha)$ requires: $\cos(\alpha) = \max(\cos(\alpha), 0)$.), $Id_r$, $Id_g$, $Id_b$ respectively are the diffuse reflection values for the red, green, and blue elements, $Kd_r$, $Kd_g$ and $Kd_b$ are the diffuse reflection coefficients for the red, green and blue elements of the light source (which are a constant between 0 and 1 and vary according to the material of the surface), and $C_r$, $C_g$ and $C_b$ are the colors of red, green and blue elements of the surface.

Specular reflection is the highlight observed on a shiny surface. The model developed by Bui Tuong-Phong modulates specular reflection as a function of the cosine of the angle between V, the vector to the eyepoint, and R, the vector which aligns with the maximum reflection as illustrated in FIG. 1b (Phong, B. T. "Illumination for Computer Generated Images", PhD Dissertation, Dept. of Computer Science, University of Utah, Salt Lake City, Gov. Ordering No. AD-A0008-786 (July 1973)). For further information on ambient, diffuse and specular reflection, see also Foley and Van Dam *Fundamentals of Interactive Computer Graphics*, (Addison Wesley 1983), pp. 575-580 and Cook and Torrance, "A Reflectance Model For Computer Graphics", *Computer Graphics*, Vol. 15, No. 3, August 1981.

The amount of reflection is additive. Thus, if 3 separate light sources shine light on a surface, the amount of reflection on the surface is compute by determining the amount of reflection with respect to each light source and summing the amount of reflection determined with respect to each light source. When determining the type of reflection and amount of reflection, it should be recognized that there exists different types of light sources. One case occurs if the solution assumes the distance to the light is infinite. The specification for the light source reduces to the simple light vector below:

$$L = Lx, Ly, Lz$$

where the magnitude of the light vector equals, $$|L| = \operatorname{sqrt}(Lx^2 + Ly^2 + Lz^2)$$

and the value of $|L|$ equals 1 for an infinite light source.

Another case occurs if the solution assumes the distance to the light is finite but the radiation pattern is isotopic. The light therefore radiates the same intensity in all directions. The specification of the light source in this case reduces to the light position:

$$Q = Qx, Qy, Qz$$

The light vector, that is the light position relative to the vertex position, Px, Py, Pz, is:

$$L = Qx - Px, Qy - Py, Qz - Pz$$

where the magnitude is:

$$|L| = sqrt\ ((Qx-Px)^2 + (Qy-Py)^2 + (Qz-Pz)^2).$$

Since the magnitude may not be one, and the illumination equations require unit vectors, the light vector is normalized:

$$L = (Qx-Px)/|L|, (Qy-Py)/|L|, (Qz-Pz)/|L|.$$

Still another case occurs when the radiation pattern is not isotropic. Since the radiation pattern is not isotropic, the specification of the light source requires the pattern vector which specifies the radiation pattern function:

$$K = Kx, Ky, Kz.$$

The pattern vector serves to describe the direction where the light intensity is maximum. The light which strikes the object then decreases as the angle between the light vector, L, and the pattern vector, K, increases. The light vector, before inclusion of the pattern function is as before:

$$L = (Qx-Px)/|L|, (Qy-Py)/|L|, (Qz-Pz)/|L|$$

where the magnitude is $$|L| = sqrt\ ((Qx-Px)^2 + (Qy-Py)^2 + (Qz-Pz)^2).$$

The pattern function, which adjusts the intensity as a function of the angle between the light vector and the pattern vector, is often:

$$\cos(\kappa) = Kx*Lx + Ky*Ly + Kz*Lz.$$

The light vector absorbs this value to become:

$$L = \cos(\kappa)*Lx, \cos(\kappa)*Ly, \cos(\kappa)*Lz.$$

Computer graphics systems typically represent curved surfaces of images as a mesh of planar polygons that are shaded to restore a smooth appearance. The systems attempt to restore the smooth appearance by varying the intensity across the polygons. Although there are techniques for realistic shading of polygons, real time systems do not use them because of the large amount of computation required per pixel. The simplest shading computation that may be performed is the diffuse reflection computation, which follows Lambert's Law for diffuse light. However, this computation assumes the same brightness of reflection from all viewing angles. Since the simple diffuse equation does not cast the reflection equations in terms of the physical attributes of the surface, for example, a roughness coefficient, the expression only approximates the reflection. The expression, for example, does not described how the wavelength can shift with the incident angle when the light strikes metallic surfaces. This wavelength shift causes the color to change. In addition, the simple diffuse equation does not attempt to take into account how light scatters from surface to surface.

Furthermore, the simplest version of the diffuse reflection assumes the reflection is constant across the entire facet or polygon. While this is simple to compute, the intensity is often discontinuous at the boundary between polygons. A better technique for performing shading of images in real time is referred to as Gouraud Shading. In the Gouraud Shading technique, the intensity at each point is computed by the linear interpolation of the intensities at the vertices of the polygon. These intensities are determined using the reflection equation for diffuse reflection with the normals given at the vertices. For further information on the Gouraud Shading see, Gouraud, H. "Continuous Shading of Curved Surfaces", *IEEE Transactions on Computers*, Vol. 20, No. 6, pp. 623-628 (June 1971). However, this technique accounts solely for diffuse reflection and thus surfaces shaded by this technique appear dull. In addition, the images may reflect mach bands at polygon boundaries due to discontinuous intensity changes.

The Phong Shading technique illuminates the dull surfaces and reduces the mach bands which the Gouraud Shading technique produces, but typically is not used in real time systems because of the large amount of computation time and expense required for the generation of the image. In this technique, the intensity of each point is determined using an approximate surface normal that is linearly interpolated from the true surface normal specified at the vertices. Phong shading utilized the equation $N(x,y) = Ax + By + C$ where A, B, C are the chosen vertices to interpolate the normal across the polygon. The Phong Shading equation requires 7 additions, 6 multiplications, 1 division and 1 square root per pixel. This operation is very expensive and time consuming, particularly because it includes the square root computation. For further information on Phong Shading, see Phong, B, T. "illustration for Computer Generated Images", PhD Dissertation, Dept. of Computer Science, University of Utah, Salt Lake City, Gov. Ordering No. AD-A0008-786.

The Phong Shading calculation was simplified by Tom Duff as described in "Smoothly Shaded Renderings of Polyhedral Objects on Raster Displays", *ACM Computer Graphics*, Vol. 13, No. 2, pp. 270-275 (1979). Duff simplified Phong shading by combining the interpolation and reflection equations:

$$I\ \text{diffuse}\ (x,y) = \frac{L}{|L|} \cdot \frac{Ax + By + C}{|L|\ |Ax + By + C|}$$

$$= \frac{L \cdot A + L \cdot By + C}{|L|\ |L \cdot Ax + L \cdot By + L \cdot C|}$$

$$= \frac{ax + by + c}{sqrt(dx^2 + exy + fy^2 + gx + ny + 2)}$$

where, $$a = \frac{L \cdot A}{|L|}$$

$$b = \frac{L \cdot B}{|L|}$$

$$c = \frac{L \cdot C}{|L|}$$

$$d = A \cdot A$$
$$e = 2A \cdot B$$
$$f = B \cdot B$$
$$g = 2A \cdot C$$
$$n = 2B \cdot C$$
$$i = C \cdot C$$

Thus this implementation can be evaluated for successive values of x and y with only 3 additions, 1 division and 1 square root per pixel. Although this is an improvement over Phong's formulation, the division and square root computations still render the technique too time consuming and expensive for real time implementation.

In still another implementation of Phong's shading, an approximation of the r eflection equation is computed, there by saving the time and expense required to compute the reflection equation exactly. In Weimer, "Fast Phong Shading", *Computer Graphics*, Vol. 20, No. 4, (1986), pp. 103-105, a second order Taylor series approximation is used to compute the reflection. To simplify the approximation, the polygon is shifted so that the (0,0) coordinate lies at the center of the polygon. Using this technique, the intensity at a pixel can be evaluated using only two additions per pixel.

However, in all the above techniques, the same functions are used to determine the reflection of all polygons of an image. If the reflection for some of the polygons of the image can only be determined at the desired level of quality using a complex, time consuming process, all polygons are processed using the same process. Thus, to render a quality image, a complex time consuming process is employed to get desired quality for the image, even though the reflection for a significant number of polygons could have been determined using a simpler faster process.

SUMMARY OF THE INVENTION

It is an object of the present invention to provide a real time technique for the generation of shaded images.

It is an object of the present invention to provide an adaptive method for the shading of images in which the technique to shade the image is determined according to the curvature of the surface, the variation of the light vector across the surface, and the variation of the eye vector across the surface.

In the method and apparatus of the present invention an adaptive shading method is utilized to generate shaded images in real time. The color or intensity is first computed at each of the vertices of the polygon. A series of tests are then performed to determine the order equation that is to be used to interpolate the color or intensity across the polygon between the vertices. Using this technique, polygons having a slight or no curvature and an infinite light source (thus being the simplest form of shading), will use an extremely fast, low order equation to interpolate across the polygon. Polygons, having a high degree of curvature and/or positional light source will utilize, as necessary, a higher order equation which requires additional computation time but produces desirable shading results.

BRIEF DESCRIPTION OF THE DRAWINGS

The objects features and advantages of the present invention will be apparent in the following description of the invention in which

FIG. 9 is a table which compares the quality of images generated according to the system of the present invention to images generated according to the Phong Shading method.

FIGS. 10a-10e illustrate the nomenclature and variables employed when utilizing second and third order equations in the system of the present invention.

NOTATION AND NOMENCLATURE

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION OF THE INVENTION

General System Configuration

Figure 1A:
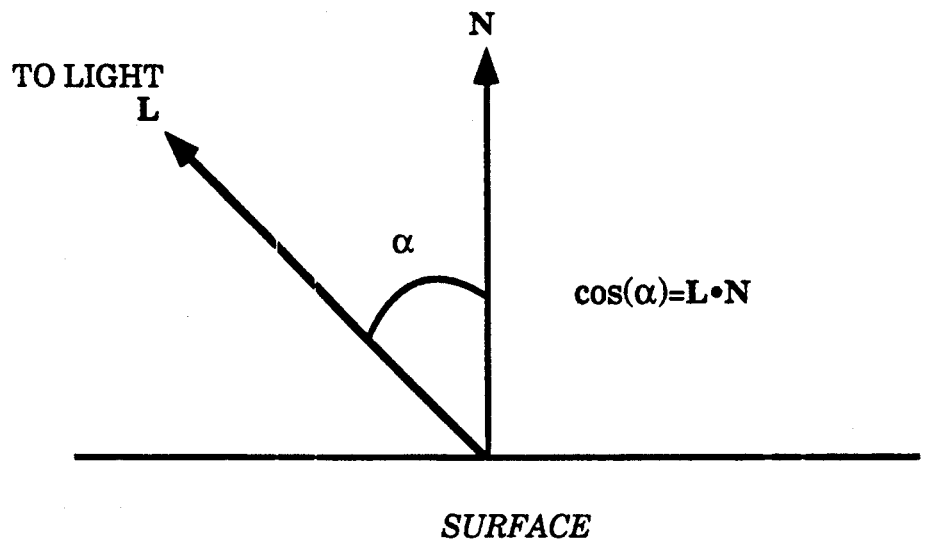
FIG. 1a and 1b illustrate the nomenclature and variables used in prior art shading techniques.
Figure 1B:
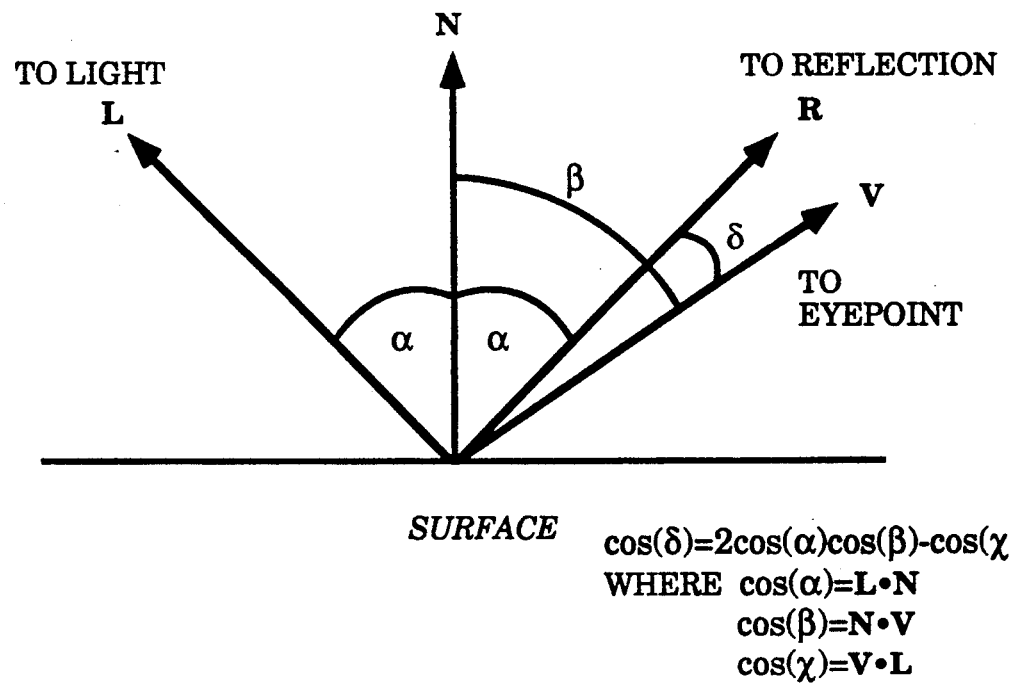
Figure 2:
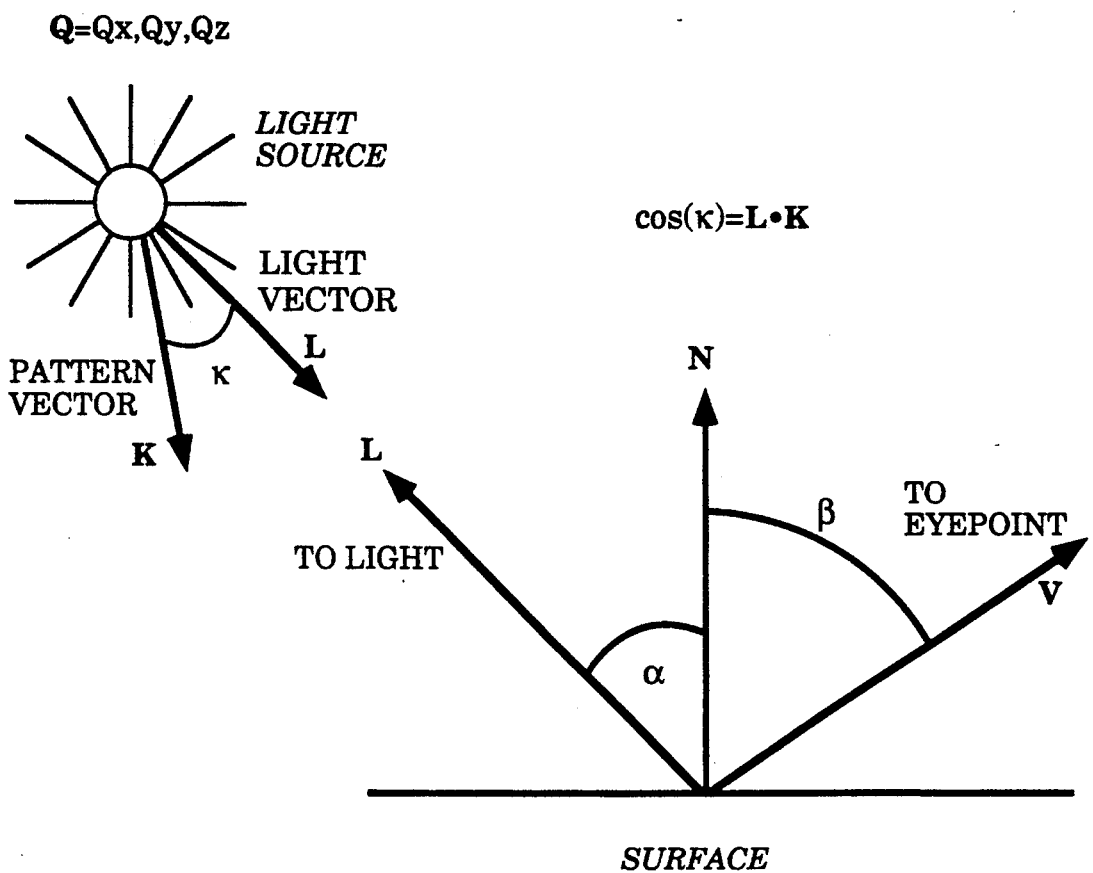
FIG. 2 illustrates the geometries used in the specular shading computations.
Figure 3A:
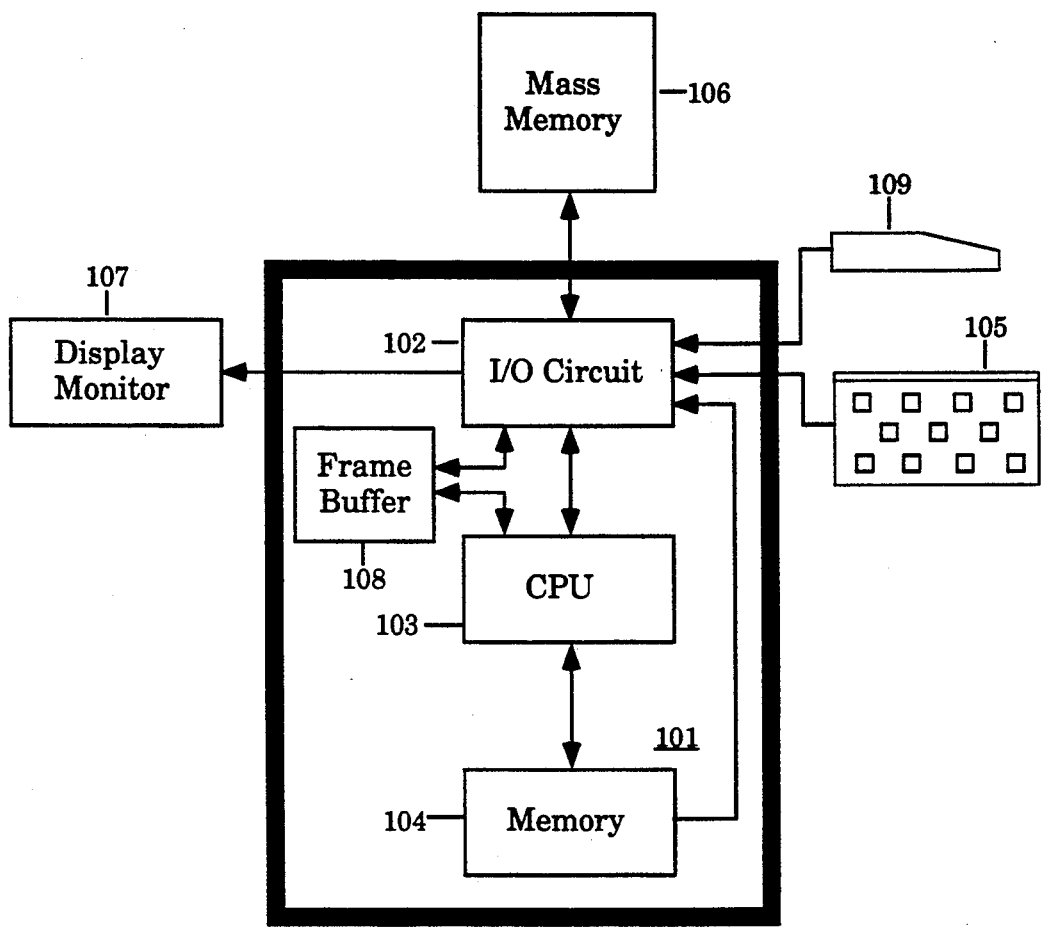
FIG. 3a is an illustration of a computer system employed in the system of the present invention.

FIG. 3a shows a typical computer-based system for adaptive image shading of polygons according to the present invention. Shown there is a computer 101 which comprises three major components. The first of these is the input/output (I/O) circuit 102 which is used to communicate information in appropriately structured form to and from the other parts of the computer 101. Also shown as a part of computer 101 is the central processing unit (CPU) 103 and memory 104. These latter two elements are those typically found in most general purpose computers and almost all special purpose computers. In fact, the several elements contained within computer 101 are intended to be representative of this broad category of data processors. Particular examples of suitable data processors to fill the role of computer 101 include machines manufactured by Sun Microsystems, Inc., Mountain View, Calif. Other computers having like capabilities may of course be adapted in a straightforward manner to perform the functions described below.

Also shown in FIG. 3a is an input device 105, shown in typical embodiment as a keyboard. It should be understood, however, that the input device may actually be a card reader, magnetic or paper tape reader, or other well-known input device (including, of course, another computer). A mass memory device 106 is coupled to the I/O circuit 102 and provides additional storage capability for the computer 101. The mass memory may include other programs and the like and may take the form of a magnetic or paper tape reader or other well known device. It will be appreciated that the data retained within mass memory 106, may, in appropriate cases, be incorporated in standard fashion into computer 101 as part of memory 104.

In addition, a display monitor 107 is illustrated which is used to display messages or other communications to the user as well as graphic images, e.g., the shaded images rendered according to the process of the present invention. The display monitor comprises a matrix of display elements, referred to as pixels, which are enabled or turned on in a specific pattern at predetermined intensities to provide a graphic image on the display. If the display is a color monitor, for each basic color element, e.g., red, green and blue elements, the pixels are enabled in a specific pattern at a predetermined intensity. The viewer of the displayed image visually combines the red, green, and blue elements at each pixel to perceive a color image. Such a display monitor may take the form of any of several well-known varieties of CRT displays. The graphic image data is provided to the frame buffer 108. The I/O circuit 102 reads the graphic image data from the frame buffer 108 and enables the corresponding pixels on the display monitor 107 at the location and intensity specified by the graphic image data. A cursor control 109 is used to select command modes and edit the input data, and in general provides a more convenient means to input information into the system.

Figure 3B:
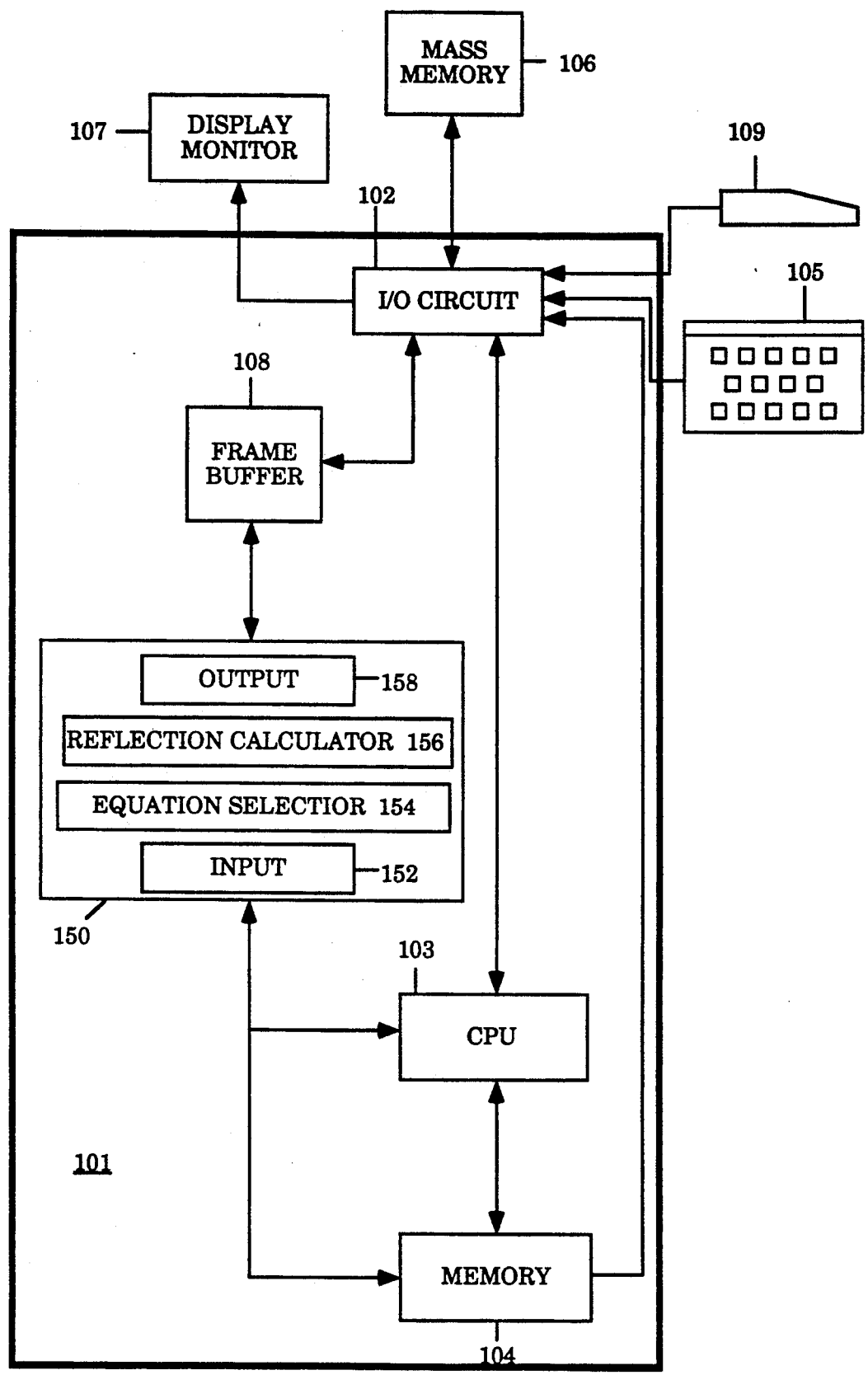
FIG. 3b is an illustration of an alternate computer system employed in the system of the present invention.

FIG. 3b discloses an alternate embodiment of the computer system of FIG. 3a which includes a subsystem which performs some of the functions of the adaptive shading process described herein. In FIG. 3b, the adaptive shading subsystem 150 is coupled to the CPU 103 and the memory 104. The adaptive shading subsystem 150 is comprised of an input 152 for receiving polygon image data, an equation selector 154 for selecting a reflection equation to be used, a reflection calculator 156 for calculating the reflection across each polygon, and an output 158 for outputting the pixel data to the frame buffer 108.

Process Description

In the present invention, the steps to determine the amount of shading across a polygon surface is adapted to the curvature of the polygon, the position of the light source with respect to the surface of the polygon, and the position of the eyepoint, that is, the position of the eye of the viewer with respect to the surface of the polygon. The greater the curvature of the polygon, the closer the light source is to the polygon and the closer the eyepoint is to the polygon, the greater the variation of reflection across the polygon surface and the more steps are required to accurately determine the amount of shading across the polygon surface.

This observation is used to provide a quality image-rendering process without the computational overhead and expense required to generate quality images by consistently using high order shading equations. A series of tests are performed to determine the amount of curvature, the position of the light source, and the position at the eyepoint with respect to the polygon. If the amount of curvature is minimal, and the distance to the light source and eyepoint is large, a simple, fast zero order equation is used to compute the reflection across the polygon. This is possible because if the normal vector variation is small, indicating little surface curvature, and the light vector variation and eye vector variation are small, the amount of reflection will be constant across the polygon. If the variation of the amount of reflection is small, for example, if the reflection varies less than 1 part in 256, the variation is almost imperceptible to the viewer, and if the reflection varies less than 1 part in 64, the variation is still subtle. Thus it is possible to approximate the color variation with a constant color value.

When the amount the reflection varies across the polygon increases, a higher order equation is used to compute the reflection across the polygon. This generates a more accurate representation of reflection which cannot be achieved using a zero order equation. As the amount of curvature becomes greater and/or as the position of the light source becomes closer such that the directional vector from the vertices of the polygon to the light source varies from vertex to vertex, a higher order equation is used. A higher order equation, although computation intensive, must be used in order to render a quality image because the amount of reflection varies across the surface of the polygon significantly to be perceptible to the viewer and therefore, the amount of shading across the polygon is not constant.

Figure 4A:
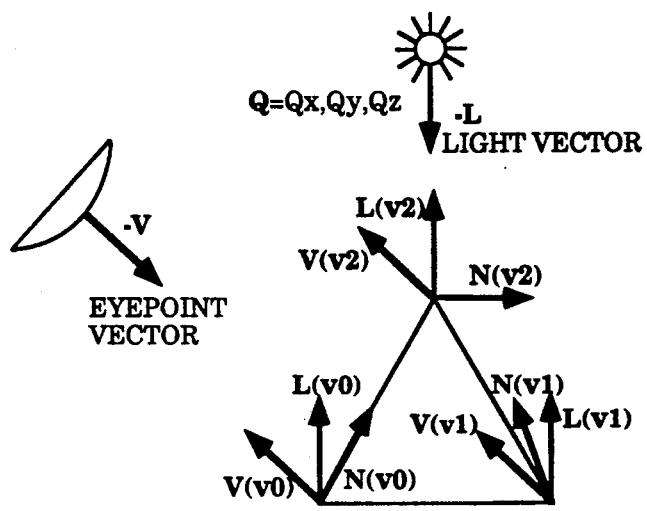
FIGS. 4a, 4b and 4c illustrate the illumination of surfaces which require higher order equations to generate quality shaded images.
Figure 4B:
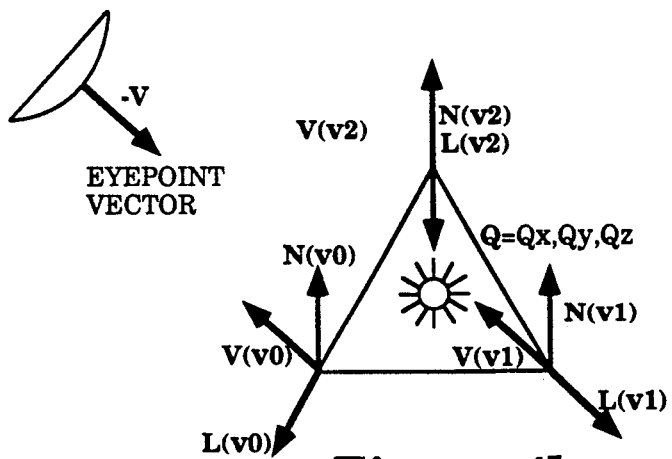
Figure 4C:
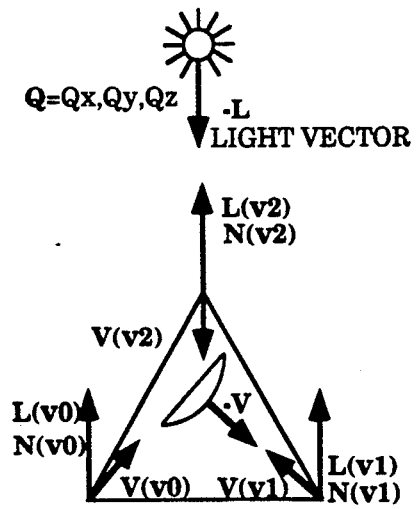

FIGS. 4a, 4b and 4c illustrate three situations where the zeroth order and first order expression to determine reflection are not adequate. Referring to FIG. 4a, the surface curvature across the triangle is assumed to be large. Therefore, the vertex normal vector N varies and the diffuse reflection, which is the projection of the vertex normal vector onto the vertex light vector L, varies. Thus, it is desirable to select an equation order which preserves this reflection variation. In this example, the first order equation would not be adequate, and the system would select the next higher order (Phong) equation to simulate the reflection. It should be noted that the Phong equation is not, strictly speaking, a second order equation. The technique involves normalization, which requires a square root and a division, at each pixel. The literature, however, notes that second order equations approximate this solution (see Weimer, "Fast Phong Shading", *Computer Graphics*, Vol 20, No 4 (1986) pp 103-105). Thus the discussion will refer, except where noted, to the Phong equation as a second order equation.

It is assumed that the triangle illustrated in FIG. 4b has no curvature, that is the vertex normal vectors are identical, but the light position is just above the triangle surface. Therefore, the vertex light vector varies and the diffuse reflection, which is the projection of the vertex normal vector onto the vertex light vector, varies. An equation order which preserves this variation would then be selected.

Referring to FIG. 4c, it is assumed that the triangle has no curvature, but the eyepoint position is just above the triangle surface. Thus, the vertex eyepoint vector varies, the specular reflection which involves the projection of the vertex normal vector onto the vertex eyepoint vector varies. The system of the present invention would detect this situation and select the equation order which preserves the reflection variation.

Thus, the system balances out the advantages of fast low cost computations with lower quality images and slow, higher cost computations with higher quality images. Fast, low cost computations are preferably used to determine the amount of reflection on a polygon; however, if the curvature of the polygon, the position of the light source, or the position of the eyepoint indicate a significant reflection variation across the surface, a higher order equation is used to render a quality image. Thus, the slower, cost intensive, higher order computations are performed only when necessary. The polygons having little curvature, large distances to the light source, and large distances to the eyepoint, are quickly and inexpensively computed using lower equations. It has been found that a substantial portion of the polygons which form an image can be rendered using a zero order or first order equation. Images rendered using the adaptive shading system of the present invention are generated 20-50% faster than images rendered using higher order equations with little or no perceptible degradation in image quality.

In the preferred embodiment, three types of equations may be used to compute the amount of reflection across the polygon: zero order, first order and second order. The zero order equation computes a constant value for the entire polygon surface. Preferably the zero order equation follows Lambert's Law and computes the diffuse reflection weight according to:

$$\cos(\alpha) = N \cdot L,$$

where N is the normal to the surface and L is light vector. The normal may be a vertex normal or a normal at any point along the surface. Preferably, the normal is the average normal of the vertex normals.

A first order equation is preferably computed according to the Gouraud shading technique. The Gouraud technique generates an image of adequate quality when the variation of reflection across the polygon surface is small. It is preferred that when the variation of reflection across the polygon surface is significant, indicating the need to employ a second order equation, the Phong shading technique is used.

Figure 5A:
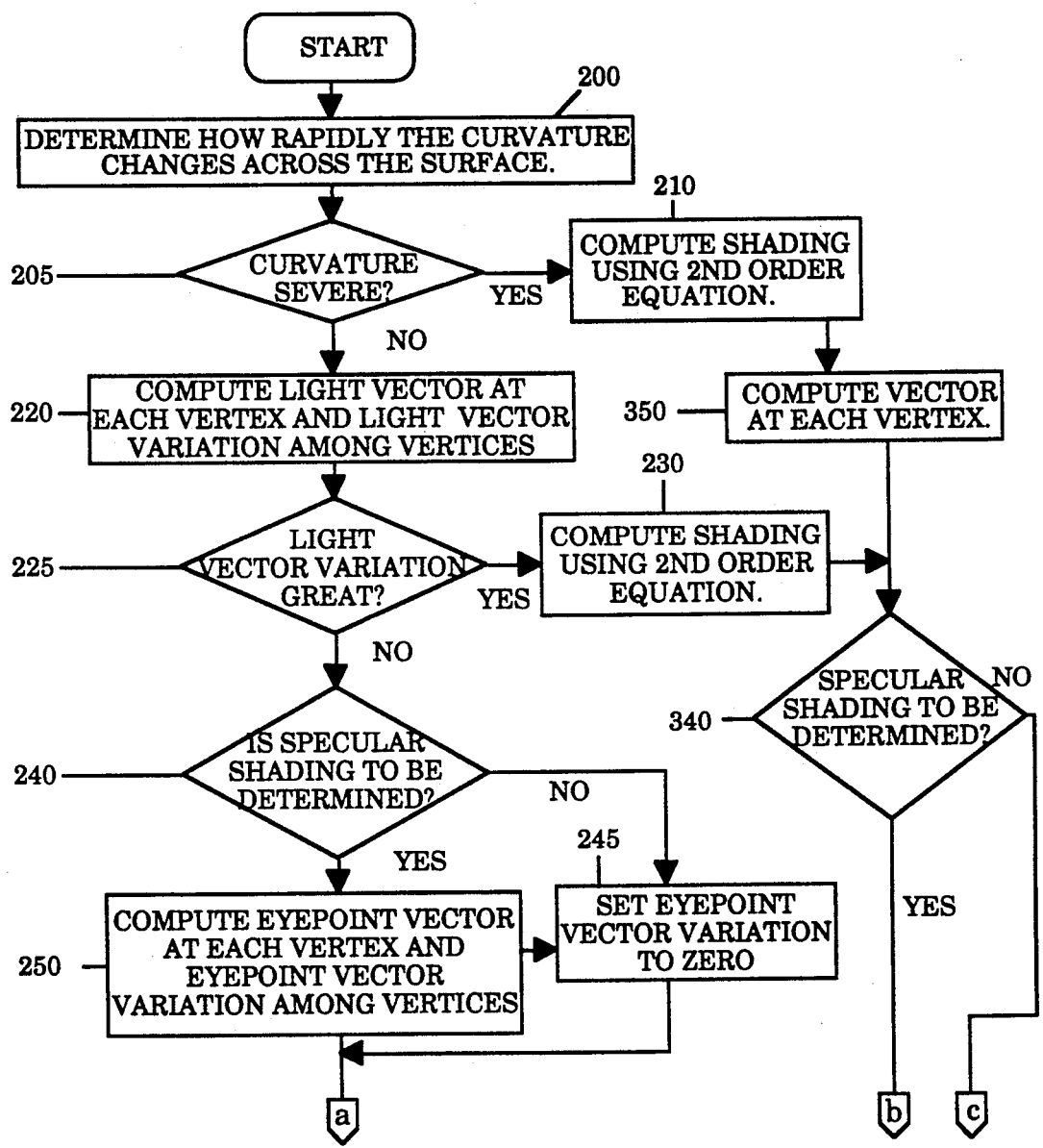
FIG. 5 is a flowchart which illustrates a preferred embodiment of the present invention.
Figure 5B:
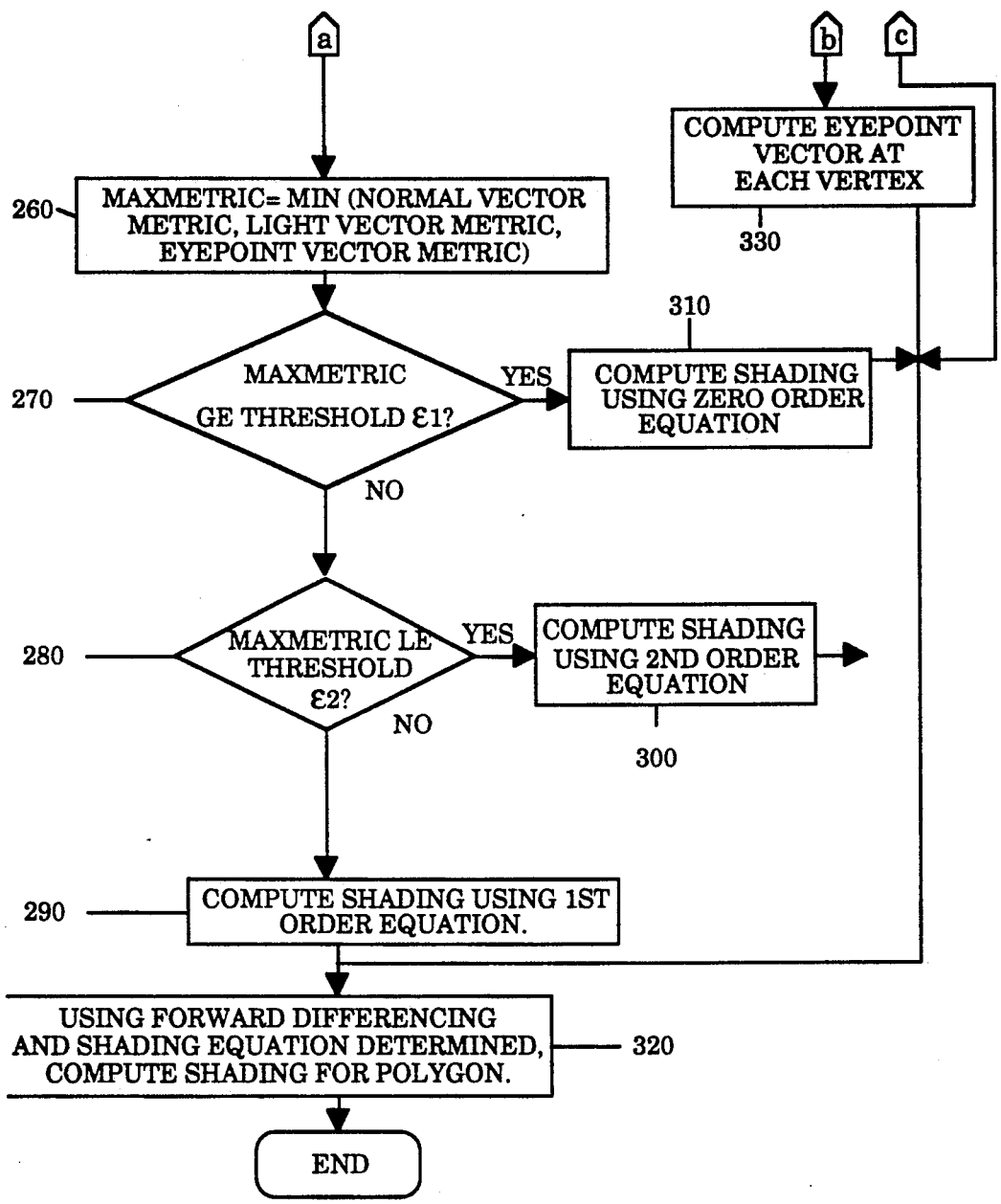
Figure 6A:
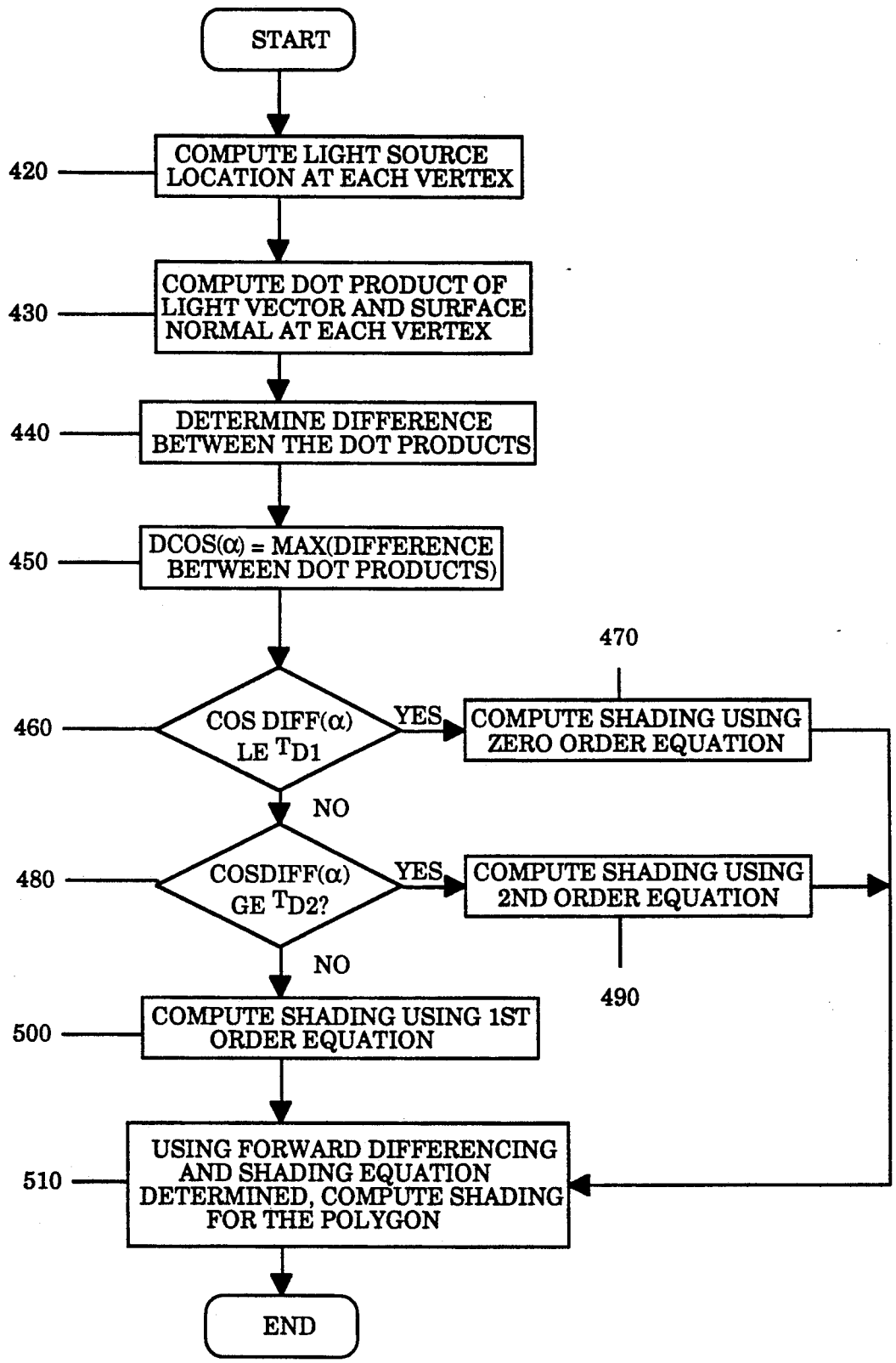
FIGS. 6a and 6b are flowcharts which illustrate other preferred embodiments of the present invention.
Figure 6B:
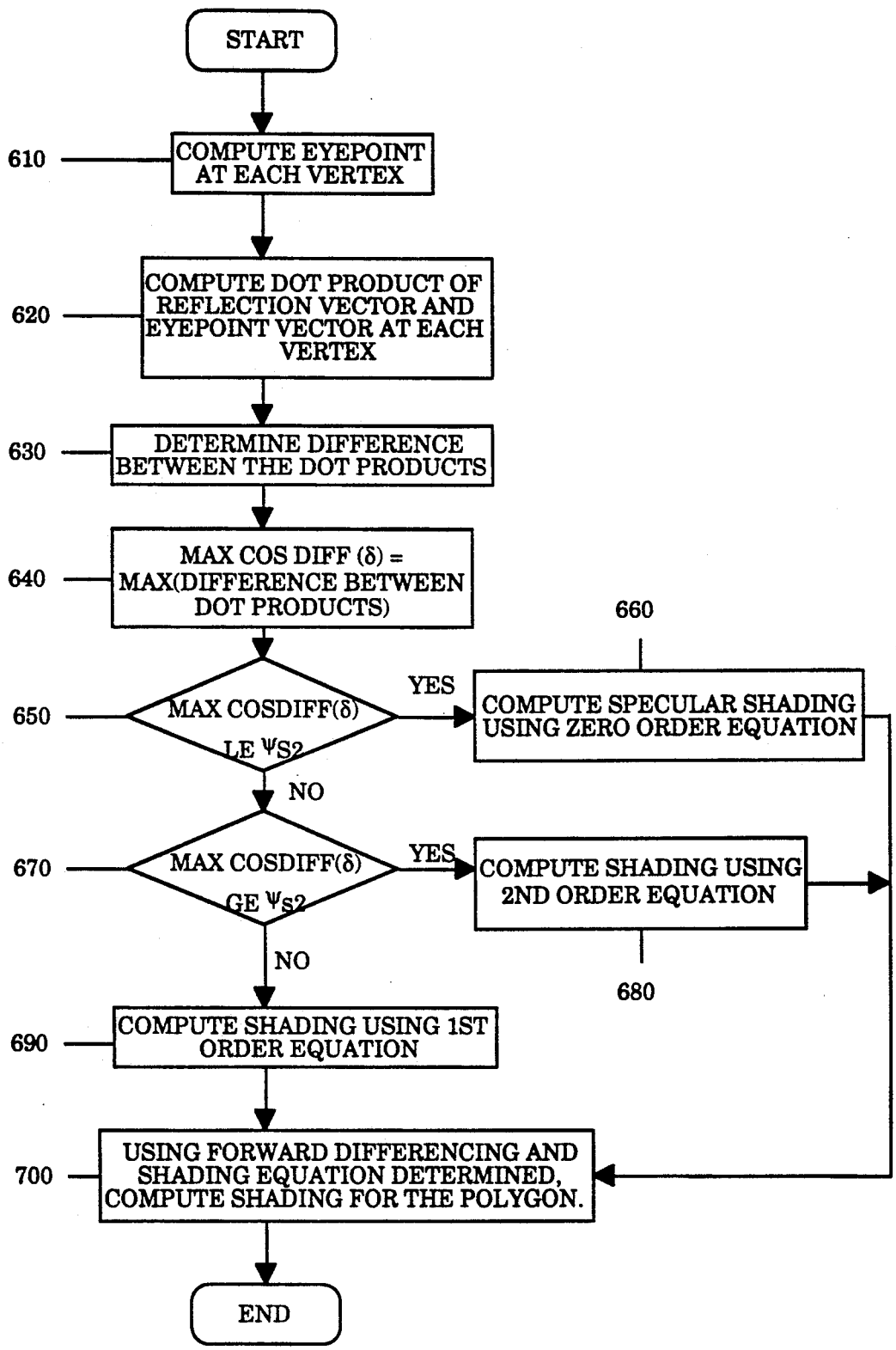

The process of the present invention is described with reference to FIGS. 5, 6a and 6b. FIG. 5 illustrates the flow of the process with respect to a first embodiment of the present invention and FIGS. 6a and 6b illustrate the flow of the process with respect to other embodiments of the present invention. The preferred embodiments will be described with respect to image renderings using scan line techniques; however, as will be evident to one skilled in the art, the present invention applies not only to the scan line techniques but also to other techniques, such as plane equations, to interpolate the color at the polygon vertices or other boundary conditions across the polygon.

Using a scan line technique, the display elements the polygon intersects for each scan line are determined and the color for each of these display elements is derived from the vertex attributes (color, position and normal) using known shading equations such as the zero, first or second order equations described above. To interpolate the vertex attributes (or other boundary conditions) across the display elements the polygon intersects, difference variables are determined. The difference variables specify how to increment the vertex attributes (depth, normal, color) along the polygon edges and across the scan line between polygon edges. In most cases and as illustrated below, the normal difference variable (as well as color and position) is determined. However, if the test criteria described herein indicate that the light vector and/or eye vector varies, the difference variables for the same would be determined, in the same manner as the normal difference variable is determined, and the attributes would also be interpolated across the polygon.

Figure 7A:
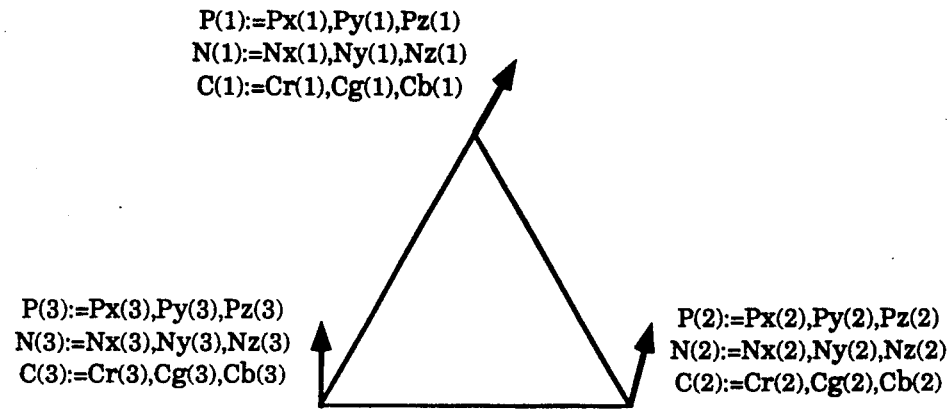
FIGS. 7a-7d illustrate the nomenclature and variables employed in a preferred embodiment of the present invention.
Figure 7B:
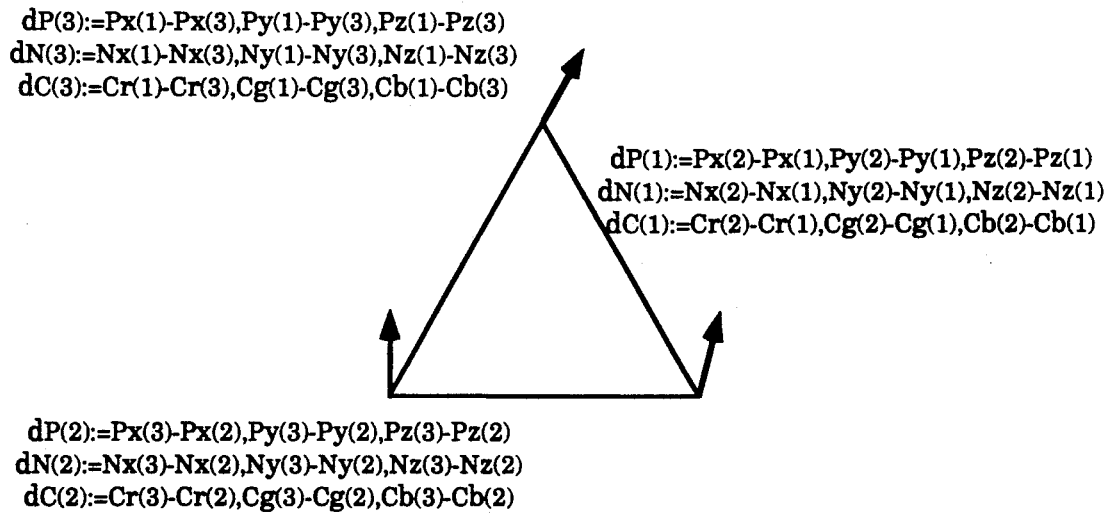

Referring to FIG. 7a and 7b, the difference variables for position, normal, and color are first determined by the following:

| | | |
|---|---|---|
| dPx(1)=Px(2)−Px(1) | dPx(2)=Px(3)−Px(2) | dPx(3)=Px(1)−Px(3) |
| dPy(1)=Py(2)−Py(1) | dPy(2)=Py(3)−Py(2) | dPy(3)=Py(1)−Py(3) |
| dPz(1)=Pz(2)−Pz(1) | dPz(2)=Pz(3)−Pz(2) | dPz(3)=Pz(1)−Pz(3) |
| dNx(1)=Nx(2)−Nx(1) | dNx(2)=Nx(3)−Nx(2) | dNx(3)=Nx(1)−Nx(3) |
| dNy(1)=Ny(2)−Ny(1) | dNy(2)=Ny(3)−Ny(2) | dNy(3)=Ny(1)−Ny(3) |
| dNy(1)=Ny(2)−Ny(1) | dNy(2)=Ny(3)−Ny(2) | dNy(3)=Ny(1)−Ny(3) |
| dCr(1)=Cr(2)−Cr(1) | dCdr(2)=Cr(3)−Cr(2) | dCr(3)=Cr(1)−Cr(3) |
| dCg(1)=Cg(2)−Cg(1) | dCdr(2)=Cg(3)−Cg(2) | dCg(3)=Cg(1)−Cg(3) |
| dCb(1)=Cb(2)−Cb(1) | dCdr(2)=Cb(3)−Cb(2) | dCb(3)=Cb(1)−Cb(3) | where dPx(1), dPy(1), dPz(1) represent the position difference variables for the edge between the first vertex and second vertex; dPx(2), dPy(2), dPz(2) represents the position difference variables for the edge between the second vertex and third vertex; dPx(3), dPy(3), dPz(3) represent the position difference variables for the edge between the third vertex and the first vertex. The variables dNx(1), dNy(1), dNz(1) represent the normal difference variables for the normals at the first vertex and the second vertex; dNx(2), dNy(2), dNz(2) are the normal difference variables for the normals at the second vertex and the third vertex; and dNx(3), dNy(3), dNz(3) are the normal difference variables for the normals at the third vertex and first vertex. The variables dCr(1), dCg(1), dCb(1) represent the color difference variable along the edge between the first and second vertex; dCr(2), dCg(2) and dCb(2) represent the color difference variables along the edge between the second and third vertex; and dCr(3), dCg(3), and dCb(3) represent the color difference variables along the edge between the third and first vertex.

From the magnitude of the position difference variables (dPx versus dPy) the major axis can be determined. The major axis indicates the direction in which to render the edges of the polygon. In the present illustration, the major axis is the y axis for the first edge, the y axis for the second edge and the x axis for the third edge. The position difference variable for the minor axis is divided by the major axis difference variable to derive the increment for the minor axis. Then one unit increments are used to traverse the triangle edges according to scan line rendering techniques. The vertices are then sorted to determine a left edge and right edge of each scan line.

According to the logic of the scan line technique, the variables used in the scan line equations to describe the edges between the vertices are initialized to be the vertex attributes and increment variables derived from the difference variables are used to traverse the polygon. The position difference variables, after division by the major axis, yields normalized position increments, the normal difference variables, after division by the major axis, yield the normalized normal increments, and the color difference variables, after division by the major axis, yield the normalized color increment:

| | | |
|---|---|---|
| dPx(1):=dPx(1)/dPy(1) | dPx(2):=dPx(2)/dPy(2) | dPx(3):=1 |
| dPy(1):=1 | dPy(2):=1 | dPy(3):=dPy(3)/dPx(3) |
| dPz(1):=dPz(1)/dPx(1) | dPz(2):=dPz(2)/dPx(2) | dPz(3):=dPz(3)/dPx(3) |
| dNx(1):=dNx(1)/dPy(1) | dNx(2):=dNx(2)/dPy(2) | dNx(3):=dPz(3)/dPx(3) |
| dNy(1):=dNy(1)/dPy(1) | dNy(2):=dNy(2)/dPy(2) | dNy(3):=dPy(3)/dPx(3) |
| dNz(1):=dNz(1)/dPy(1) | dNz(2):=dNz(2)/dPy(2) | dNz(3):=dPy(3)/dPx(3) |
| dCr(1):=dCr(1)/dPy(1) | dCr(2):=dCr(2)/dPy(2) | dCr(3):=dCr(3)/dPx(3) |
| dCg(1):=dCg(1)/dPy(1) | dCg(2):=dCg(2)/dPy(2) | dCg(3):=dCg(3)/dPx(3) |
| dCb(1):=dCb(1)/dPy(1) | dCb(2):=dCb(2)/dPy(2) | dCb(3):=dCb(3)/dPx(3) |

The increment values are then utilized to interpolate the vertex attributes along the triangle edges using edge interpolation logic:

| | | |
|---|---|---|
| Px(1):=Px(1)+dPx(1) | Px(2):=Px(2)+dPx(2) | Px(3):=Px(3)+1 |
| Py(1):=Px(1)+1 | Py(2):=Py(2)+1 | Py(3):=Py(3)+dPy(3) |
| Pz(1):=Pz(1)+dPz(1) | Pz(2):=Pz(2)+dPz(2) | Pz(3):=Pz(3)+dPz(3) |
| Nx(1):=Nx(1)+dNx(1) | Nx(2):=Nx(2)+dNx(2) | Nx(3):=Nx(3)+dNx(3) |
| Ny(1):=Ny(1)+dNy(1) | Ny(2):=Ny(2)+dNy(2) | Ny(3):=Ny(3)+dNy(3) |
| Nz(1):=Nz(1)+dNz(1) | Nz(2):=Nz(2)+dNz(2) | Nz(3):=Nz(3)+dNz(3) |
| Cr(1):=Cr(1)+dCr(1) | Cr(2):=Cr(2)+dCr(2) | Cr(3):=Cr(3)+dCr(3) |
| Cg(1):=Cg(1)+dCg(1) | Cg(2):=Cg(2)+dCg(2) | Cg(3):=Cg(3)+dCg(3) |
| Cb(1):=Cb(1)+dCb(1) | Cb(2):=Cb(2)+dCb(2) | Cb(3):=Cb(3)+dCb(3) |

Figure 7C:
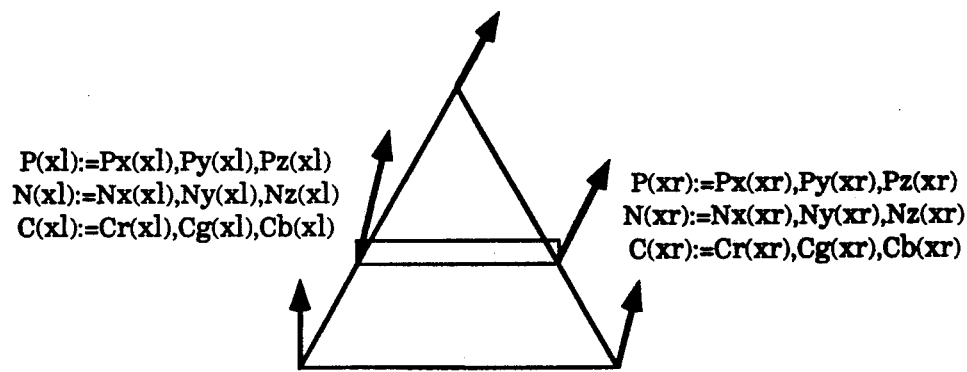
Figure 7D:
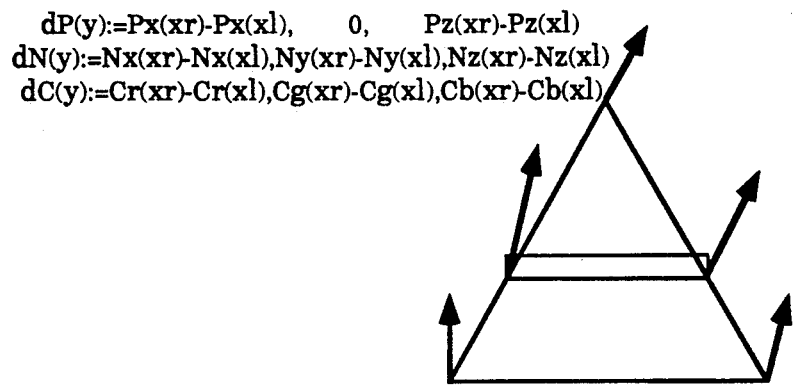

To traverse the polygon, the vertex attributes are interpolated to create values at the left side and right side of the scan line (see FIG. 7c). To fill the scan line, the difference variables for the scan line are first determined. The difference variables for the scan line of FIG. 7d are:

| | | |
|---|---|---|
| dPx(y):=Px(xr)−Px(xl) | dNx(y):=Nx(xr)−Nx(xl) | dCr(y):=Cr(xr)−Cr(xl) |
| dPy(y):=0 | dNy(y):=Ny(xr)−Ny(xl) | dCg(y):=Cg(xr)−Cg(xl) |
| dPz(y):=Pz(xr)−Pz(xl) | dNz(y):=Nz(xr)−Nz(xl) | dCb(y):=Cb(xr)−Cb(xl) |

The variables are then divided by the width of the scan line, that is dPx(y), to normalize the variables and produce uniform increment variables for the scan line (preferably to match the uniform increments of the raster):

| | | |
|---|---|---|
| dPx(y):=1 | dNx(y):=dNx(y)/dPx(y) | dCg(y):=dCr(y)/dPx(y) |
| dPx(y):=0 | dNy(y):=dNy(y)/dPx(y) | dCg(y):=dCg(y)/dPx(y) |
| dPz(y):=dPz(y)/dPx(y) | dNz(y):=dNz(y)/dPx(y) | dCb(y):=dCb(y)/dPx(y) |

With this information, the vertex attributes are interpolated across the triangle to fill the triangle:

| | | |
|---|---|---|
| Px(x,y):=Px(x,y)+1 | Nx(x,y):=Nx(x,y)+dNx(y) | Cr(x,y):=Cr(x,y)+dCr(y) |
| Py(x,y):=constant | Ny(x,y):=Ny(x,y)+dNy(y) | Cg(x,y):=Cg(x,y)+dCg(y) |
| Pz(x,y):=Pz(x,y)+dPz(y) | Nz(x,y):=Nz(x,y)+dNz(y) | Cb(x,y):=Cb(x,y)+dCb(y) |

The first order solution to the reflection expression simplifies the rendering process. Unlike higher order solutions, the first order solution eliminates the need to determine the difference equations for the normal vectors. Instead, the diffuse reflection weights at the vertices (1, 2, 3) are determined:

$$\cos(\alpha 1) := Lx(1)*Nx(1) + Ly(1)*Ny(1) + Lz(1)*Nz(1)$$

$$\cos(\alpha 2) := Lx(2)*Nx(2) + Ly(2)*Ny(2) + Lz(2)*Nz(2)$$

$$\cos(\alpha 3) := Lx(3)*Nx(3) + Ly(3)*Ny(3) + Lz(3)*Nz(3).$$

The diffuse weights are then absorbed into each of the vertex color attributes.

$$Cr(1) = (Ka_r + Kd_4*\cos(\alpha 1))*Cr(1)$$
$$Cg(1) = (Ka_g + Kd_4*\cos(\alpha 1))*Cg(1)$$
$$Cb(1) = (Ka_b + Kd_4*\cos(\alpha 1))*Cb(1)$$
$$Cr(2) = (Ka_4 + Kd_4*\cos(\alpha 2))*Cr(2)$$
$$Cg(2) = (Ka_4 + Kd_4*\cos(\alpha 2))*Cg(2)$$
$$Cb(2) = (Ka_4 + Kd_4*\cos(\alpha 2))*Cb(2)$$
$$Cr(3) = (Ka_4 + Kd_4*\cos(\alpha 3))*Cr(3)$$
$$Cg(3) = (Ka_4 + Kd_4*\cos(\alpha 3))*Cg(3)$$
$$Cb(3) = (Ka_4 + Kd_4*\cos(\alpha 3))*Cb(3)$$

It should be noted that the expressions above described the diffuse reflection for one light source. If there are multiple light sources, the solution sums the diffuse reflections, since the contributions are additive.

In the first order solution, the position difference variables and color difference variables are determined as explained above. There is not need to determine the normal difference variables. The vertex color values account for the diffuse weight values. However, a problem which arises with this solution is that the diffuse weight can be understated. A second order solution corrects this by utilizing the normal difference variables. As described above, the normal vectors at the vertices are first interpolated along the polygon edge and then are normalized with respect to its magnitude. The normal vector is then incremented across the scan line of the polygon between the left and right polygon edges and is normalized at each display element.

This normal vector is then used to calculate the diffuse weight at each display element:

$$\cos(\alpha(x,y)) := Lx(x,y)*Nx(x,y) + Ly(x,y)*Ny(x,y) + Lz(x,y)*Nz(x,y)$$

and the diffuse weight is incorporated into the color values:

$$Cr(x,y) := (Ka_r + Kd_r*\cos(\alpha(x,y)))*Cr(x,y)$$

$$Cg(x,y) := (Ka_g + Kd_g*\cos(\alpha(x,y)))*Cg(x,y)$$

$$Cb(x,y) := (Ka_b + Kd_b*\cos(\alpha(x,y)))*Cb(x,y).$$

The formulation above assumes the light vector, L(x,y), does not vary across the polygon. If the light vector in fact does vary, the light vector as well as the normal vector must be interpolated and normalized. The additional interpolations and normalization are time-consuming and expensive. The system of the present invention simplifies the reflection calculation in three respects. First, the system of the present invention determines when to apply the zeroth order, first order, and second order solutions, such that the expensive high order solutions are only used when the normal vector variation, light vector variation, or eyepoint vector variation actually require it. Second, the system of the present invention may optionally detect which specific vector values require interpolation by determining which vectors significantly vary across the polygon and thereby avoiding the time consuming interpolation of the three vector values, including those which do not require interpolation. In addition, the system of the present invention may optionally substitute ordinary difference equations to interpolate the color value. This option avoids the more expensive classic solution which interpolates and normalizes the three vectors.

Figure 8A:
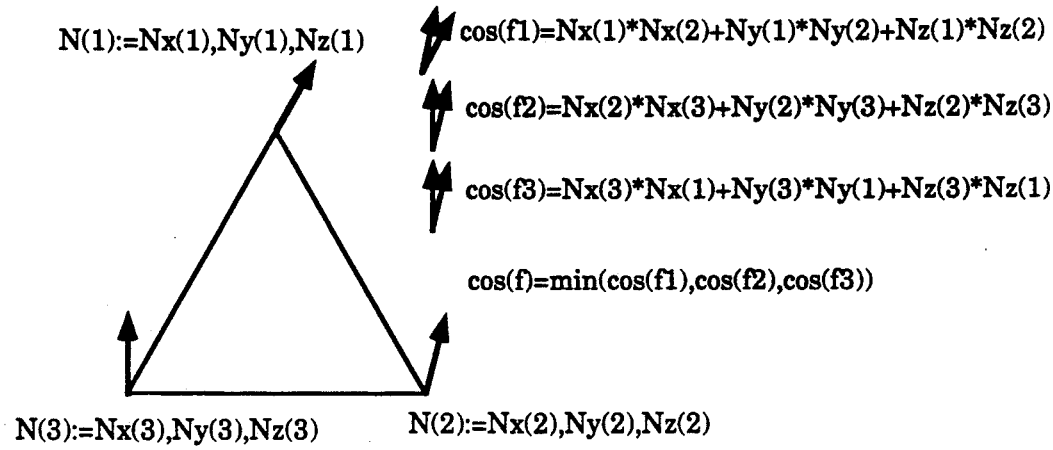
FIGS. 8a, 8b, 8c further illustrate the nomenclature and variables employed in a preferred embodiment of the present invention.

Referring to FIG. 5, the process of the present invention will be explained. At block 200, the curvature across the surface is determined. This is determined according to the normals at each of the vertices of the polygon and the amount of curvature determined from the normals, and comparing the amount of curvature between pairs of vertices to determine if the curvature across the polygon surface is severe. Preferably the following equations are used (referring to FIG. 8a):

$$\cos(\phi) = \min(\cos\phi(1)), \cos(\phi(2)), \cos(\phi(3)))$$

where $$\cos(\phi(1)) = Nx(1)*Nx(2) + Ny(1)*Ny(2) + Nz(1)*Nz(2)$$

$$\cos(\phi(2)) = Nx(2)*Nx(3) + Ny(2)*Ny(3) + Nz(2)*Nz(3)$$

$$\cos(\phi(3)) = Nx(3)*Nx(1) + Ny(3)*Ny(1) + Nz(3)*Nz(1).$$

The $\cos(\phi)$ value measures the maximum variation between the vertex normal vectors. This predicts the maximum curvature on the polygon. If, at block 205, the $\cos(\phi)$ value indicates severe curvature, a second order shading equation is implemented at block 210, otherwise the $\cos(\phi)$ value is saved to be used subsequently in the process.

A predetermined threshold value is used to determine the value of $\cos(\phi)$ which indicates severe curvature. The threshold value is preferably empirically determined. The threshold value corresponds to the minimum curvature for which a quality image can only be generated using a second (or higher) order equation. The criteria of quality is application dependent. For example, if $\cos(\alpha)$ is about one, indicating that L and N are parallel, and if the criteria were to preserve 8 bits of precision for the color terms, then the threshold values to select the zeroth order, first order, and second order equations would be:

1.000 > $\cos(\phi)$ > 0.996, use zeroth order
0.996 > $\cos(\phi)$ > 0.992, use first order
0.992 > $\cos(\phi)$ > 0 use, second order.

Preferably the threshold value is modifiable by the user to customize the process for each application used and each image generated. Typically, if cosine ($\phi$) is approximately a value of one, the curvature across the polygon is minimal and the process flow continues to block 220. If the curvature is severe and indicates that a fast, low order shading equation would not provide the desired quality in the image, a more precise, but time consuming and costly, high order shading process is used. Of course, if the user requires an image to be generated quickly and does not care about the quality, the threshold value can be set to a lower value in order to generate a greater percentage of the polygons of the image using a zero order equation. For example, if the criteria were to preserve 4 bits of precision for the color terms, the threshold values to selected the zeroth order, first order, and second order equations would be:

1.000 > cos $(\phi)$ > 0.938 use zeroth order
0.938 > cos $(\phi)$ > 0.879 use first order
0.879 > cos $(\phi)$ > 0 use second order.

Similarly, if the user requires a precisely shaded image, the threshold value can be set to a value closer to the value of one to cause a larger percentage of the polygons to be rendered using a higher order shading equation. If the curvature is not severe, at block 220, the variation of the location of the light source with respect to the vertices is determined.

Figure 8B:
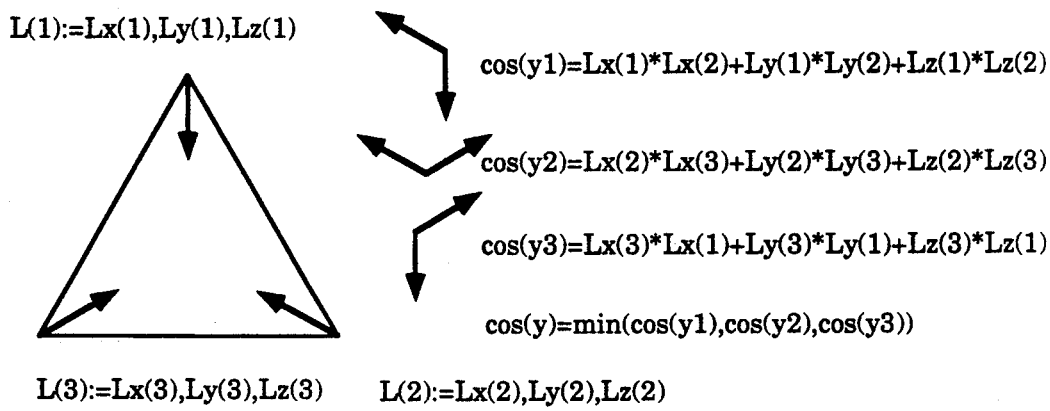

The light direction relative to a vertex will vary more the closer the light source is to the polygon. For an infinite light source, that is one located an infinite distance away, the light source direction is the same for all vertices. A position light source, one in which is located a finite distance away, as illustrated by FIG. 8b, the light source location variation among the vertices is determined:

$$\cos(\psi) = \min(\cos(\psi(1)), \cos(\psi(2)), \cos(\psi(3)))$$

where $$\cos(\psi(1)) = Lx(1)*Lx(2) + Ly(1)*Ly(2) + Lz(1)*Lz(2)$$

$$\cos(\psi(2)) = Lx(2)*Lx(3) + Ly(2)*Ly(3) + Lz(2)*Lz(3)$$

$$\cos(\psi(3)) = Lx(3)*Lx(1) + Ly(3)*Ly(1) + Lz(3)*Lz(1)$$

where $Lx$, $Ly$, $Lz$ represents the position of the light source with respect to the vertex.

The cos $(\psi)$ value is a measurement of the variation between the vertex light vectors. If the light source type is an infinite light source, the cos $(\psi)$ value is, by definition, a value of one. If the variation, at block 225, is found to be severe, the second order shading equation is implemented (block 230).

Figure 8C:
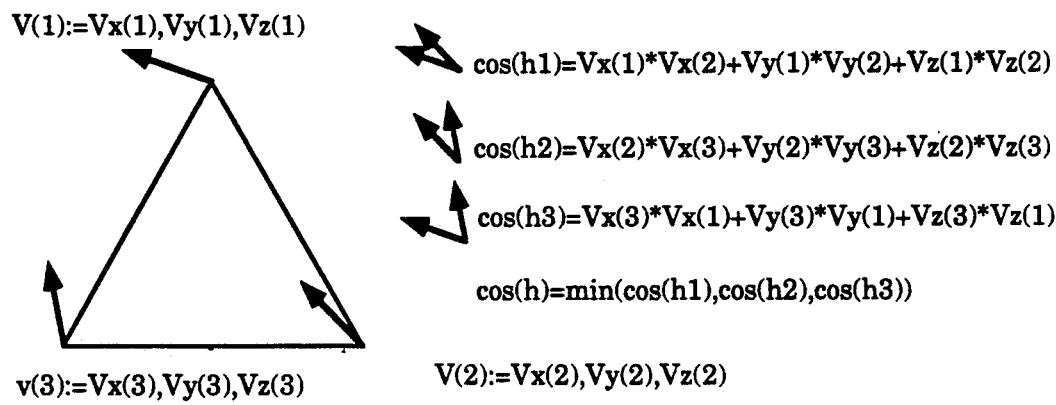

If the reflection equations include specular reflection, (block 240), the vertex eyepoint vectors (see FIG. 8c), that is, the eyepoint position relative to the vertex position, is calculated at block 250:

$$\cos(\eta) = \min(\cos(\eta(1)), \cos(\eta(2)), \cos(\eta(3)))$$

where $$\cos(\eta(1)) = Vx(1)*Vx(2) + Vy(1)*Vy(2) + Vz(1)*Vz(2)$$

$$\cos(\eta(2)) = Vx(2)*Vx(3) + Vy(2)*Vy(3) + Vz(2)*Vz(3)$$

$$\cos(\eta(3)) = Vx(3)*Vx(1) + Vy(3)*Vy(1) + Vz(3)*Vz(1).$$

Specular shading includes the amount of highlight on a surface. The highlight directly corresponds to the location of the light source with respect to the surface and the location of the eye with respect to the light source at the surface. If the reflection equations are not to include specular shading, at block 245, the cos $(\eta)$ is set to one, indicating there is no variation in the eyepoint vector.

The maximum intensity variation is then determined, at block 260, as a function of the normal vector variation, light vector variation, and the eye point vector variation. The function below, for example, selects the minimum value of the three cosine metrics, thereby selecting the maximum angle variation:

$$\cos(\phi\psi\eta) = \min(a(\phi)*\cos(\phi), a(\psi)*\cos(\psi), a(\eta)*\cos(\eta)).$$

The weights $a(\phi)$, $a(\psi)$, $a(\eta)$ reflect how the three cosines values affect the complete reflection equation. A small change in the cos $(\eta)$ value, for example, may translate to a large change in the reflection intensity which reaches the eye. Thus the weights are used to "even out" the values such that an accurate determination of the maximum variation can be made.

At block 270 and 280, tests are performed to determine whether a first order or a second order shading equation should be used to compute the shading of the polygon by comparing the maximum intensity variance to threshold values. A first and second threshold value may be empirically determined or adjusted by the user for each application according to the quality of the image desired and the amount of time to generate the image. Preferably the first threshold value is in the range of 0.996 to 0.938 and the second threshold value is in the range of 0.938 to 0.879. For example, for a maximum variation, cos $(\phi\gamma,\eta)$:

1 > cos $(\phi\gamma\eta)$ > $\epsilon 1$ use zeroth order
$\epsilon 1$ > cos $(\phi\gamma\eta)$ > $\epsilon 2$ use first order
$\epsilon 2$ > cos $(\phi\gamma\eta)$ > 0 use 2nd order.

At block 270, maximum intensity variation is compared to the first threshold value $\epsilon 1$. If the maximum intensity variation is greater than the first threshold value, a zero order equation is used (block 310). If the variation is less than or equal to the first threshold value, at block 280 the maximum variation is compared to the second threshold value $\epsilon 2$. If the maximum intensity variation is less than the second threshold value, the shading is generated using a second order equation. If it is not, at block 290, shading is performed using a first order equation. Once the order of the reflection equation to be used is determined, the color values are determined along the edges of the polygon and the polygon is rendered using forward differencing to render the pixel (display elements) on each scan line which intersects the polygon (block 320).

A second embodiment of the present invention is described with reference to FIGS. 6a and 6b. FIG. 6a describes an embodiment which includes the diffuse reflection. FIG. 6b describes an embodiment which also includes specular reflection. Alternatively, the embodiment described below with respect to FIG. 6a may be combined with the embodiment described with respect to FIG. 5 to provide a comprehensive system which utilizes when applicable, the speed of the embodiment described with respect to FIG. 6a and the high precision of the embodiment described with respect to FIG. 5. Similarly, the embodiment described with respect to FIG. 6a may be combined with the embodiment of FIG. 5.

Referring to FIG. 6a, at block 420, the location of the light source with respect to each of the vertices is determined. If the light source is a position light source, that is, a light source which is a finite distance from the vertices of the polygon, the location of the light source with respect to each of the vertices will vary. If the light source is an infinite light source, the location of the light source will be the same at each of the vertices.

At block 430, the dot product of the light vector and surface normal at each vertex is determined, and, at block 440, the difference in value between each of the dot products at the vertices is computed. At block 450, the maximum value, $\cos_{diff}(\alpha)$ is determined to be the maximum difference between dot products:

max(abs(cos (α1)−cos (α2)), abs(cos (α2)−cos (α3)), abs(cos (α3)−cos (α1))).

This value is used to determine whether a zero order, first order, second order or higher order equation is to be used to compute the shading for the polygon. A first threshold $\tau_{D1}$, is used to determine whether a zero order shading equation should be used. By using zero order shading equation, time and expense can be saved while still generating the desired quality of the rendered image. A second threshold value $\tau_{D2}$ is used to determine whether a second order shading equation should be utilized.

The threshold values $\tau_{D1}$ and $\tau_{D2}$ may be determined empirically or on an application by application basis. For example, if a user wishes to render an image with precise shading, then it is desirable to compute shading using second order reflection equations. Therefore, the threshold value $\tau_{D2}$ should be set to a value which will cause the majority of the display elements within the polygon to be rendered using the second order equation. The threshold value $\tau_{D1}$ may be set to a low value and threshold $\tau_{D2}$ may also be set to a low value such that the shading of most of the polygons of the image will be performed using second order equations. Alternatively, if the user desires to render a fast representation of an image and is not concerned with the quality of the shading, the threshold values $\tau_{D1}$ and $\tau_{D2}$ would be set to generate that effect. In particular, the threshold value $\tau_{D1}$ would be set to a high value and a threshold value $\tau_{D2}$ would be set to a high value in order that most tests performed would indicate that the zero order equation is to be used.

Preferably, the threshold values are set to values which balance the need for a quality image and the need to render the image as quickly as possible. Also the threshold values should account for how shiny the surface is, that is the beam width of the specular reflection. When the beam width is broad, the technique selects a first order equation. This yields images which range from acceptable to nearly perfect to the eye with the rendering speed ranging from 25% to 50% faster than rendering the entire images using the Phong Shading technique. Images of acceptable quality were also generated when the beam width was narrow, although discontinuity in the shading occurred along certain polygons in which one polygon was shaded using the first order equation and an adjacent polygon was shaded using a second order equation. This problem, however, can be avoided by using smaller polygons. Typically, in practice, the zero order equation is not frequently used because of the need to generate higher quality images. Therefore, the threshold value $\tau_{D1}$ is preferably set to a value of approximately 0.1 such that most polygons will be rendered using the higher order equations.

Another embodiment of the present invention is described with reference to FIG. 6b. The process flow is similar to that described in FIG. 6a, except specular reflection is included in addition to the diffuse reflection. If the process is to include specular reflection, at block 610, the eyepoint vector for each vertex is calculated. The calculation normalizes each eyepoint vector by its magnitude. At block 620, the projection of the reflection vector onto eyepoint vector at each vertex is determined (R.V). This value cos (δ(i)), predicts the specular reflection. At block 630, the difference between cos (ι(i)) values at each vertex is computed, i.e., abs(cos (δ1)−cos (δ2)), abs(cos (δ2)−cos (δ3)), abs(cos (δ)−abs(cos (δ1))). At block 640, the maximum difference is determined. If the maximum difference, $\cos_{diff}(\delta)$, is less than or equal to the first order threshold, at block 650, zeroth order shading is selected. If the maximum difference, $\cos_{diff}(\delta)$ is greater than or equal to the second order threshold, at block 670, second order shading is selected. Otherwise, first order shading, at block 690, is used.

FIG. 9 is a table which illustrates the advantages of using the technique described herein. The table shows the results of shading the same object using the Phong Shading technique, which employs a second order equation, the Gouraud technique, which employs a first order equation, and the adaptive shading technique of the present invention. The specular power is the value which is indicative of the reflective capability of the surface. As the specular power increases, the shininess of the surface increases. The render time is the amount of time taken to render the image using this technique. "NMSE" represents the normalized mean square error between the pixel representation of the image generated by the adaptive shading method and the second order Phong Shading method. This is calculated using the equation:

$$NMSE = \frac{\sum_{\text{all pixels } i} ((Pr(i) - Ar(i))^2 + (Pg(i) - Ag(i))^2 + (Pb(i) - Ab(i))^2)}{\sum_{\text{all pixels } i} (Pr(i)^2 + Pg(i)^2 + Pb(i)^2)}$$

where
Pr(i): red component of i'th pixel of image generated via Phong's method
Pg(i): green component of i'th pixel of image generated via Phong's method
Pb(i): blue component of i'th pixel of image generated via Phong's method
Ar(i): red component of i'th pixel of identical image generated via Adaptive Shading
Ag(i): green component of i'th pixel of identical image generated via Adaptive Shading
Ab(i): blue component of i'th pixel of identical image generated via Adaptive Shading.

The smaller the NMSE value, the higher the quality of the image. Thus, the lower the threshold value $\tau_{D1}$, the better the quality of the image generated and the slower the rendering time. Conversely, the higher the threshold value, the lower the quality of the image generated and the faster the rendering time regardless of the specular power used in rendering the images. In general, the NMSE of an adaptive shading generated image is less than 0.0001 (when compared to a Phong generated image), indicates that the image is approximately identical to the Phong shaded image. Images having NMSE values between 0.0001 and 0.00025 have some subtle shading discontinuities while images having NMSE values between 0.00025 and 0.0005 have shading discontinuities which are apparent. Images having NMSE values above 0.0005 are noticeably flawed to a viewer of the image.

The present invention is clearly not limited to any specific types of equations to compute the shading of a polygon. It is clear to one skilled in the art from reading the description that any well known shading techniques may be used within the scope of the invention; however, it is preferred that the following equations be used. These equations utilize many of the earlier computations executed to determine the order of the equation to use thus saving time in executing the shading algorithms. The calculations described use the scan line technique described earlier for all order equations.

The following examples utilize a triangle primitive, but the technique extends to arbitrary polygons and parametric surfaces. The normal vectors at specific points or vertices are determined from the parametric function which defines the surface. See, Bartels, Beatty, Barsky, *An Introduction to Splines for Use in Computer Graphics* (Margan Kaufmann 1987), pp 293-299; Faux, Pratt, *Computational Geometry for Design and Manufacture* (Wiley 1979), pp 110-113.

The first order solution calculates the total reflection at the triangle vertices. If the reflection consists of just ambient reflection plus diffuse reflection, the expressions are:

$$C(1) = (Ka + Kd^*\cos(\alpha 1))^*C(1),$$

$$C(2) = (Ka + Kd^*\cos(\alpha 2))^*C(2),$$

$$C(3) = (Ka + Kd^*\cos(\alpha 3))^*C(3),$$

where Ka is the coefficient of ambient reflection, Kd is the coefficient of diffuse reflection and, $$\cos(\alpha 1) = Lx(1)^*Nx(1) + Ly(1)^*Ny(1) + Lz(1)^*Nz(1),$$

$$\cos(\alpha 2) = Lx(2)^*Nx(2) + Ly(2)^*Ny(2) + Lz(2)^*Nz(2),$$

$$\cos(\alpha 3) = Lx(3)^*Nx(3) + Ly(3)^*Ny(3) + Lz(3)^*Nz(3).$$

It should be noted that to simplify the description, the equations above consolidate the separate expressions for each color component. If the color space is additive, the separate components share the same form.

If the reflection is to include specular reflection, the expression becomes:

$$C(1) = (Ka + Kd^*\cos(\alpha 1))^*C(1) + Ks^*(\cos(\delta 1))^p{}^*Cl,$$

$$C(2) = (Ka + Kd^*\cos(\alpha 2))^*C(2) + Ks^*(\cos(\delta 2))^p{}^*Cl,$$

$$C(3) = (Ka + Kd^*\cos(\alpha 3))^*C(3) + Ks^*(\cos(\delta 3))^p{}^*Cl$$

where Cl is the light source color, Ks is the coefficient of specular reflection, and $$\cos(\delta 1) = 2^*\cos(\alpha 1)^*\cos(\beta 1) - \cos(\chi^1)$$

$$\cos(\delta 2) = 2^*\cos(\alpha 2)^*\cos(\beta 2) - \cos(\chi^2)$$

$$\cos(\delta 3) = 2^*\cos(\alpha 3)^*\cos(\beta 3) - \cos(\chi^3)$$

where $$\cos(\beta 1) = Nx(1)^*Vx(1) + Ny(1)^*Vy(1) + Nz(1)^*Vz(1),$$

$$\cos(\beta 2) = Nx(2)^*Vx(2) + Ny(2)^*Vy(2) + Nz(2)^*Vz(2),$$

$$\cos(\beta 3) = Nx(3)^*Vx(3) + Ny(3)^*Vy(3) + Nz(3)^*Vz(3),$$

and $$\cos(\chi 1) = Vx(1)^*Lx(1) + Vy(1)^*Ly(1)^*Vz(1)^*Lz(1),$$

$$\cos(\chi 2) = Vx(2)^*Lx(2) + Vy(2)^*Ly(2)^*Vz(2)^*Lz(2),$$

$$\cos(\chi 3) = Vx(3)^*Lx(3) + Vy(3)^*Ly(3)^*Vz(3)^*Lz(3).$$

To minimize the difference between the color values between contiguous triangles when utilizing a zeroth order solution, the color values at the three vertices are averaged. (This average matches the color value which the first order solution realizes at the center of the triangle):

$$C = 0.33^*(C(1) + C(2) + C(3)).$$

The first order solution derives the color values as shown above. For a first order solution, the same reflection equations described above (with respect to the zeroth order solution) are used. The first order solution does not average the vertex color values but interpolates the color value. The description here describes one process using a scan line algorithm (see the Background of the Invention) with respect to vertex color. According to the edge logic, the color value is first interpolated along each triangle edge, then across each scan line of the triangle.

Figure 10A:
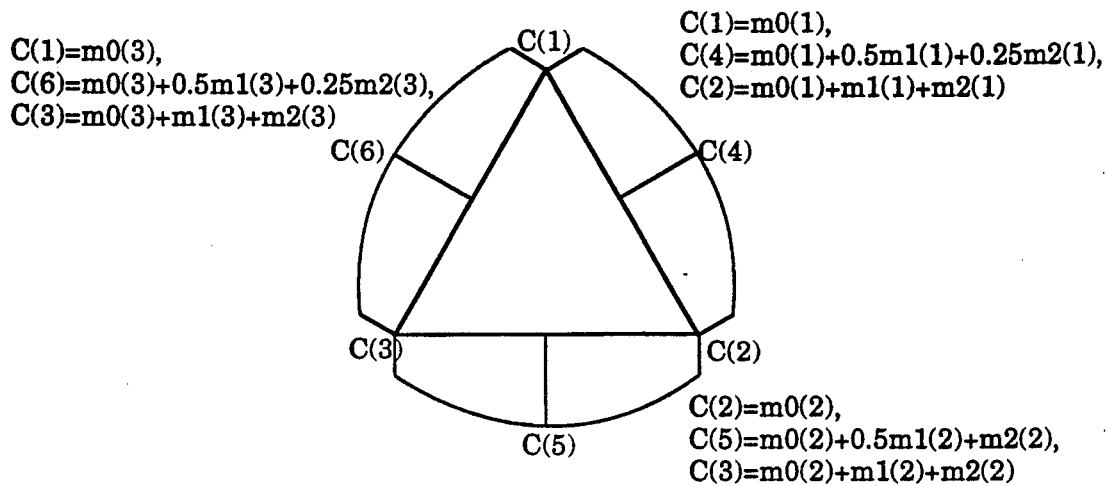

For a second order equation, the color values at the triangle vertices are determined. These color values represent two boundary conditions for each triangle edge, that is, the color values at the two end points of each triangle edge. Since the second order equation, by definition, requires three boundary conditions, the solution for ambient reflection plus diffuse reflection interpolates the normal vector and light vector to some intermediate location on the triangle edge between triangle vertices. The example below assumes this location is the center of the edge and furthermore, this example assumes the worst case, where both the normal vector and the light vector vary across the triangle. Therefore, the third boundary condition which is, in the present example, one half the distance between vertices (see FIG. 10a) is determined as follows:

| | | |
|---|---|---|
| Nx(4):=0.5*(Nx(1)+Nx(2)) | Nx(5):=0.5*(Nx(2)+Nx(3)) | Nx(6):=0.5*(Nx(3)+Nx(1)) |
| Ny(4):=0.5*(Ny(1)+Ny(2)) | Ny(5):=0.5*(Ny(2)+Ny(3)) | Ny(6):=0.5*(Ny(3)+Ny(1)) |
| Nz(4):=0.5*(Nz(1)+Nz(2)) | Nz(5):=0.5*(Nz(2)+Nz(3)) | Nz(6):=0.5*(Nz(3)+Nz(1)) | and Nx(4), Ny(4), Nz(4) are the normal coordinates for the selected point between the first vertex and second vertex, Nx(5), Ny(5) and Nz(5) are the normal coordinates for the selected point between the second vertex and third vertex and Nx(6), Ny(6) and Nz(6) are the normal coordinates for the selected point between the third vertex and first vertex.

Furthermore:

| | | |
|---|---|---|
| $Lx(4) := 0.5*(Lx(1)+Lx(2))$ | $Lx(5) := 0.5*(Lx(2)+Lx(3))$ | $Lx(6) := 0.5*(Lx(3)+Lx(1))$ |
| $Ly(4) := 0.5*(Ly(1)+Ly(2))$ | $Ly(5) := 0.5*(Ly(2)+Ly(3))$ | $Ly(6) := 0.5*(Ly(3)+Ly(1))$ |
| $Lz(4) := 0.5*(Lz(1)+Lz(2))$ | $Lz(5) := 0.5*(Lz(2)+Lz(3))$ | $Lz(6) := 0.5*(Lz(3)+Lz(1))$ | where Lx(4), Ly(4) and Lz(4) are the light vector coordinates from the selected point between the first vertex and second vertex, Lx(5), Ly(5) and Lz(5) are the light vector coordinates from the selected point between the second vertex and third vertex and Lx(6), Ly(6) and Lz(6) are the light vector coordinates from the selected point between the third vertex and the first vertex. The magnitude of the vectors are calculated to normalize the vectors. Preferably, to save on computation time and expense, the division by the magnitude is deferred until after the calculation of the diffuse weights:

$$\cos(\alpha 4) := Lx(4)*Nx(4) + Ly(4)*Ny(4) + Lz(4)*Nz(4))/(L(4)*N(4))$$

$$\cos(\alpha 5) := Lx(5)*Nx(5) + Ly(5)*Ny(5) + Lz(5)*Nz(5))/(L(5)*N(5))$$

$$\cos(\alpha 6) := Lx(6)*Nx(6) + Ly(6)*Ny(6) + Lz(6)*Nz(6))/(L(6)*N(6))$$

where $$L(4) := sqrt(Lx(4)*Lx(4) + Ly(4)*Ly(4) + Lz(4)*Lz(4))$$

$$L(5) := sqrt(Lx(5)*Lx(5) + Ly(5)*Ly(5) + Lz(5)*Lz(5))$$

$$L(6) := sqrt(Lx(6)*Lx(6) + Ly(6)*Ly(6) + Lz(6)*Lz(6))$$

and $$N(4) := sqrt(Nx(4)*Nx(4) + Ny(4)*Ny(4) + Nz(4)*Nz(4))$$

$$N(5) := sqrt(Nx(5)*Nx(5) + Ny(5)*Ny(5) + Nz(5)*Nz(5))$$

$$N(6) := sqrt(Nx(6)*Nx(6) + Ny(6)*Ny(6) + Nz(6)*Nz(6)).$$

The composite reflection for the center locations, to be used as the third boundary condition, are determined:

$$C(4) := (Ka + Kd * \cos(\alpha 4))*C(4)$$

$$C(5) := (Ka + Kd * \cos(\alpha 5))*C(5)$$

$$C(6) := (Ka + Kd * \cos(\alpha 6))*C(6).$$

In the present example, the worst case is assumed wherein the vertex color itself varies across the triangle. Thus, the color of the intermediate points along the polygon edge are:

$$C(4) = 0.5*(C(1)+C(2))$$

$$C(5) = 0.5*(C(2)+C(3))$$

$$C(6) = 0.5*(C(3)+C(1)).$$

If the composite reflection is to include specular reflection, the eyepoint vector at the center locations is determined as well. The example again assumes the worst case, that is, the eyepoint vector varies across the triangle:

| | | |
|---|---|---|
| $Vx(4) := 0.5*(Vx(1)+Vx(2))$ | $Vx(5) := 0.5*(Vx(2)+Vx(3))$ | $Vx(6) := 0.5*(Vx(3)+Vx(1))$ |
| $Vy(4) := 0.5*(Vy(1)+Vy(2))$ | $Vy(5) := 0.5*(Vy(2)+Vy(3))$ | $Vy(6) := 0.5*(Vy(3)+Vy(1))$ |
| $Vz(4) := 0.5*(Vz(1)+Vz(2))$ | $Vz(5) := 0.5*(Vz(2)+Vz(3))$ | $Vz(6) := 0.5*(Vz(3)+Vz(1))$ |

The magnitudes to normalize the vectors are then calculated. The least expensive formulation is to defer the division by the magnitude until after the calculation of the specular weights.

$$\cos(\delta 4) := 2 * \cos(\alpha 4) * \cos(\beta 4) - \cos(\chi 4)$$

$$\cos(\delta 5) := 2 * \cos(\alpha 5) * \cos(\beta 5) - \cos(\chi 5)$$

$$\cos(\delta 6) := 2 * \cos(\alpha 6) * \cos(\beta 6) - \cos(\chi 6)$$

where $$\cos(\beta 4) := (Nx(4)*Vx(4) + Ny(4)*Vy(4) + Nz(4)*Vz(4))/(N(4)*V(4))$$

$$\cos(\beta 5) := (Nx(5)*Vx(5) + Ny(5)*Vy(5) + Nz(5)*Vz(5))/(N(5)*V(5))$$

$$\cos(\beta 6) := (Nx(6)*Vx(6) + Ny(6)*Vy(6) + Nz(6)*Vz(6))/(N(6)*V(6))$$

and $$\cos(\chi 4) := (Vx(4)*Lx(4) + Vy(4)*Ly(4) + Vz(4)*Lz(4))/(V(4)*L(4))$$

$$\cos(\chi 5) := (Vx(5)*Lx(5) + Vy(5)*Ly(5) + Vz(5)*Lz(5))/(V(5)*L(5))$$

$$\cos(\chi 6) := (Vx(6)*Lx(6) + Vy(6)*Ly(6) + Vz(6)*Lz(6))/(V(6)*L(6))$$

where $$V(4) := sqrt(Vx(4)*Vx(4) + Vy(4)*Vy(4) + Vz(4)*Vz(4))$$

$$V(5) := sqrt(Vx(5)*Vx(5) + Vy(5)*Vy(5) + Vz(5)*Vz(5))$$

$$V(6) := sqrt(Vx(6)*Vx(6) + Vy(6)*Vy(6) + Vz(6)*Vz(6)).$$

The addition of the specular reflection changes the composite reflection to:

$$C(4) := (Ka + Kd * \cos(\alpha 4))*C(4) + Ks*(\cos(\delta 4)^p)*Cl$$

$$C(5) := (Ka + Kd^* \cos(\alpha 5))^* C(5) + Ks^*(\cos(\delta 5)^p)^* Cl$$

$$C(6) := (Ka + Kd^* \cos(\alpha 6))^* C(6) + Ks^*(\cos(\delta 6)^p)^* Cl$$

The additional color values C(4), C(5), C(6) provide the third boundary condition.

Figure 10B:
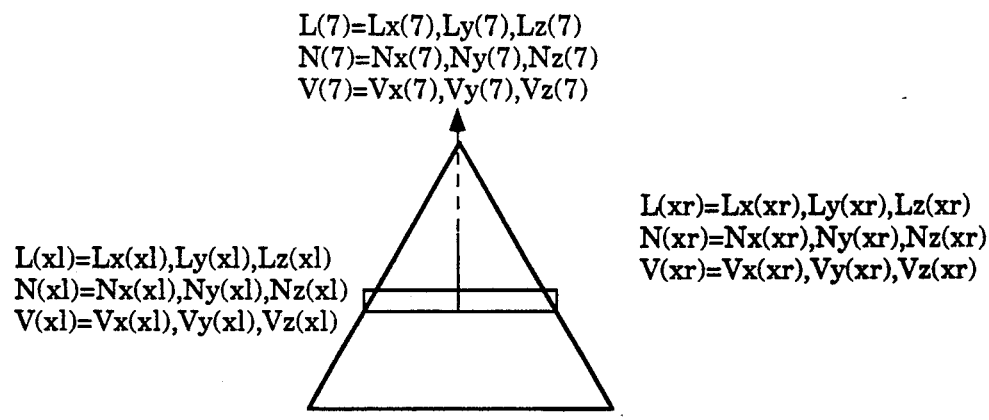

As stated above, a second order solution requires three boundary conditions (see FIG. 10b) to derive the coefficients (m0, m1, m2) of the second order equation:

$$C(u(i)) = m0(i) + m1(i)^* u(i) + m2(i)^* u(i)^2 \text{ where}$$
$$0 < = u(i) < = 1.$$

To solve for the coefficients, the simultaneous equations for three boundary conditions are determined. The boundary conditions become:

```
C(1) = m0(1)
C(4) = m0(1) + 0.5m1(1) + 0.25m2(1)
C(2) = m0(1) + m1(1) + m2(1)
C(2) = m0(2)
C(3) = m0(3)
C(5) = m0(2) + 0.5m1(2) + 0.25m2(2)
C(3) = m0(3)
C(6) = m0(3) + 0.5m1(3) + 0.25m2(3)
C(1) = m0(3) + m1(3) + m2(3)
```

The parametric variable is:

| u(1) := u(1) + du(1) | u(2) := u(2) + du(2) | u(3) := u(3) + du(3) |
|---|---|---| where

| du(1) := 1/(Py(2) − Py(1)) | du(2) := 1/(Py(3) − Py(2)) | du(3) := 1/(Px(1) − Px(3)) |
|---|---|---|

Once the coefficients are determined, the second order equation can be reduced to forward difference equations to compute the color along the edges.

Figure 10C:
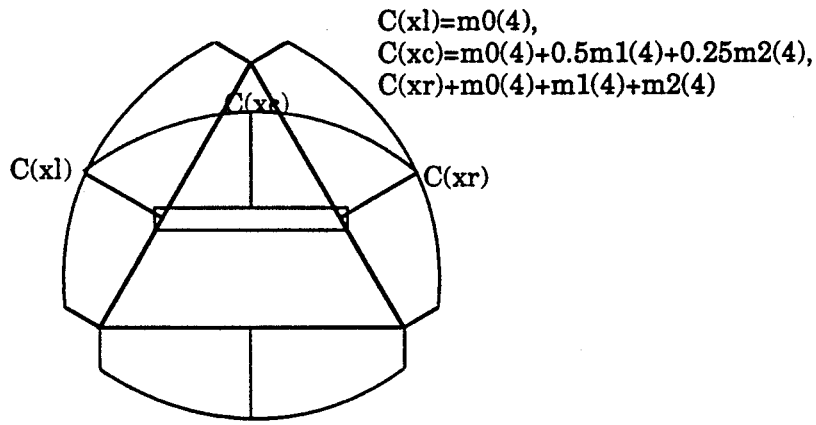

To calculate the color inside the triangle, the second order solution is employed and the values are interpolated along the edges, as shown above, to establish the vector values at each side of the raster span. The vector values are then interpolated to the center of the span. Referring to FIG. 10c, the vectors at a point located at the center of the span is determined:

| Nx(xc) := 0.5(Nx(xl) + Nx(xr)) | Lx(xc) := 0.5(Lx(xl) + Lx(xr)) | Vx(xc) := 0.5(Vx(xl) + Vx(xr)) |
| Ny(xc) := 0.5(Ny(xl) + Ny(xr)) | Ly(xc) := 0.5(Ly(xl) + Ly(xr)) | Vy(xc) := 0.5(Vy(xl) + Vy(xr)) |
| Nz(xc) := 0.5(Nz(xl) + Nz(xr)) | Lz(xc) := 0.5(Lz(xl) + Lz(xr)) | Vz(xc) := 0.5(Vz(xl) + Vz(xr)) | from which the cosine term for the reflection equations is computed:

$$\cos(\delta xc) := 2^* \cos(\alpha xc)^* \cos(\beta xc) - \cos(\chi xc)$$

where $$\cos(\alpha xc) := (Lx(xc)^* Nx(xc) + Ly(xc)^* Ny(xc) + Lz(xc)^* Nz(xc))/(L(xc)^* N(xc))$$

$$\cos(\beta xc) := (Nx(xc)^* Vx(xc) + Ny(xc)^* Vy(xc) + Nz(xc)^* Vz(xc))/(N(xc)^* V(xc))$$

$$\cos(\chi xc) := (Vx(xc)^* Lx(xc) + Vy(xc)^* Ly(xc) + Vz(xc)^* Lz(xc))/(V(xc)^* L(xc))$$

and $$L(xc) := \sqrt{(Lx(xc)^* Lx(xc) + Ly(xc)^* Ly(xc) + Lz(xc)^* Lz(xc))}$$

$$N(xc) := \sqrt{(Nx(xc)^* Nx(xc) + Ny(xc)^* Ny(xc) + Nz(xc)^* Nz(xc))}$$

$$V(xc) := \sqrt{(Vx(xc)^* Vx(xc) + Vy(xc)^* Vy(xc) + Vz(xc)^* Vz(xc))}$$

The color at the span center is therefore:

$$C(xc) := (Ka + Kd^* \cos(\alpha xc))^* C(xc) + Ks^* \cos(\delta xc)^p {}^* Cl$$

which provides the third color value to complete the boundary conditions (see FIG. 10c):

$$C(xl) = m0(4)$$

$$C(xc) = m0(4) + 0.5^* m1(4) + 0.25^* m2(4)$$

$$C(xr) = m0(4) + m1(4) + m2(4).$$

Forward difference equations are then utilized to interpolate across the triangle to realize the complete reflection equation.

This technique can also be extended to third order equations. Four color values for each edge are calculated to specify the four boundary conditions required for a third order solution. In addition to the two vertex colors, the color values at (⅓) and (⅔) the edge length are determined. Thus, the boundary conditions for the edge logic (see FIG. 10d) become:

```
C(1) = m0(1)
C(4) = m0(1) + 0.33m1(1) + 0.11m2(1) + 0.04m3(1)
C(5) = m0(1) + 0.67m1(1) + 0.44m2(1) + 0.30m3(1)
C(2) = m0(1) + m1(1) + m2(1) + m3(1)
C(2) = m0(2)
C(6) = m0(2) + 0.33m1(2) + 0.11m2(2) + 0.04m3(2)
C(7) = m0(2) + 0.67m1(2) + 0.44m2(2) + 0.30m3(2)
C(3) = m0(2) + m1(2) + m2(2) + m3(2)
C(3) = m0(3)
C(8) = m0(3) + 0.33m1(3) + 0.11m2(3) + 0.04m3(3)
C(9) = m0(3) + 0.67m1(3) + 0.44m2(3) + 0.30m3(3)
C(1) = m0(3) + m1(3) + m2(3) + m3(3)
```

The four boundary conditions across the raster scan are then determined. The boundary conditions for the scan logic (see FIG. 10e) become:

```
C(xl) = m0(4)
C(xm) = m0(4) + 0.33m1(4) + 0.11m2(4) + 0.04m3(4)
C(xn) = m0(4) + 0.67m1(4) + 0.44m2(4) + 0.30m3(4)
C(xr) = m0(4) + m1(4) + m2(4) + m3(4)
```

The scan line technique is one method to interpolate the vertex attributes (color) across the triangle. The advantage of using the scan line technique is that it extends to polygons of arbitrary shapes because the polygon is always reduced to simple segments between edges and the vertex attributes are computed for each segment. However, the difference equations computed include the division calculations for each segment, a time consuming process Alternatively, in the instance of a triangle primitive, plane equations can be used. The three boundary conditions are the vertex state at the three triangle vertices and the difference equations are computed for the entire primitive. Thus, difference equations apply to the entire triangle. Although plane equations are easily applied to a triangle polygon, plane equations may not apply to a polygon having more than three vertices because the vertices may not be coplanar.

Figure 11A:
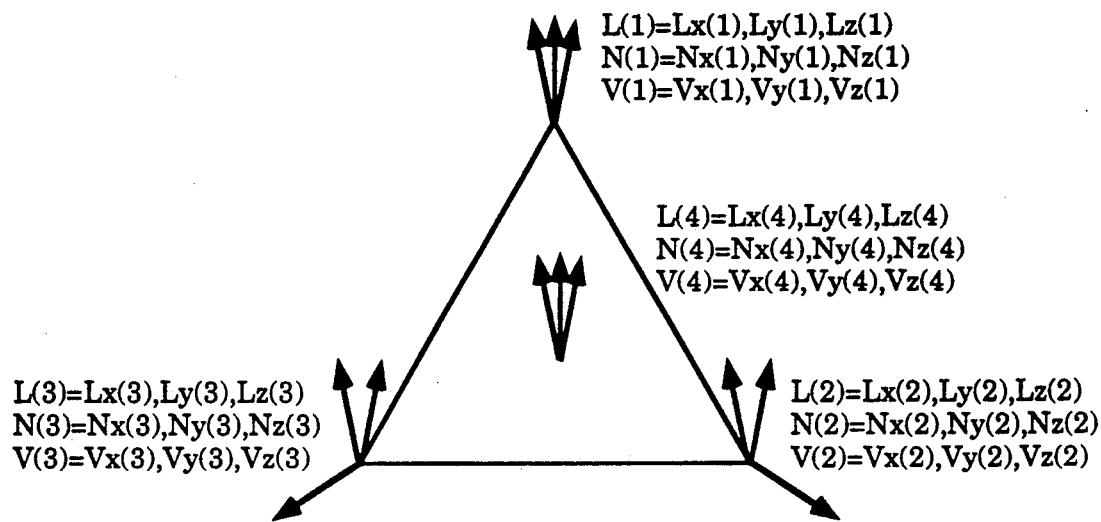
FIGS. 11a and 11b illustrate the nomenclature and variables employed when utilizing plane equations in the system of the present invention.
Figure 11B:
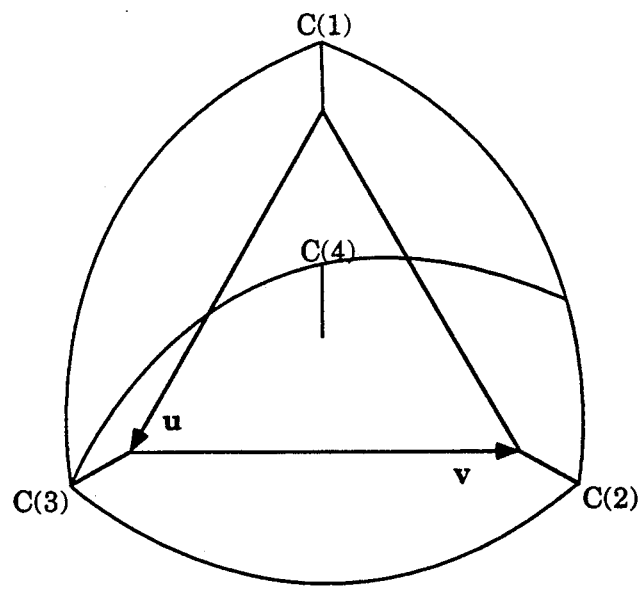

To determine shading using the plane equations, the color at the three vertices is first calculated. The boundary conditions are then calculated. To compute the boundary conditions, the vectors (normal, light and eyepoint vectors) at the triangle center are determined (see FIG. 11a). The vectors are incorporated into the color value using the reflection equations described above. These four color values are then substituted into the bilinear expression:

$$C(u,v) = \begin{vmatrix} 1 & v^1 \end{vmatrix} \begin{vmatrix} m00 & m01 \\ m10 & m11 \end{vmatrix} \begin{vmatrix} 1 \\ u^1 \end{vmatrix}$$

and $0 <= u <= 1, 0 <= v <= 1$ and the (u,v) parametric

The boundary conditions for the first order solution are:

| | |
|---|---|
| $C(1) = m00 + m01*u + m10*v + m11*u*v$ | where $u=0, v=0$ |
| $C(2) = m00 + m01*u + m10*v + m11*u*v$ | where $u=1, v=1$ |
| $C(3) = m00 + m01*u + m10*v + m11*u*v$ | where $u=1, v=0$ |
| $C(4) = m00 + m01*u + m10*v + m11*u*v$ | where $u=2/3, v=1/2$ | and thus $C(1) = m00$
$C(2) = m00 + m01 + m10 + m11$
$C(3) = m00 + m01$
$C(4) = m00 + 0.67*m01 + 0.5*m10 + 0.33*m11$ There are algebraic solutions for the (c00, c01, c10, c11) coefficients. The bilinear expression for the color is converted into forward difference equations, which are used to interpolate across the triangle.

The plane technique extended may be to second order equations. The formulation would be:

$$C(u,v) = \begin{vmatrix} 1 & v^1 & v^2 \end{vmatrix} \begin{vmatrix} m00 & m01 & m02 \\ m10 & m11 & m12 \\ m20 & m21 & m22 \end{vmatrix} \begin{vmatrix} 1 \\ u^1 \\ u^2 \end{vmatrix}$$

where $0 <= u <= 1, 0 <= v <= 1$

Figure 11C:
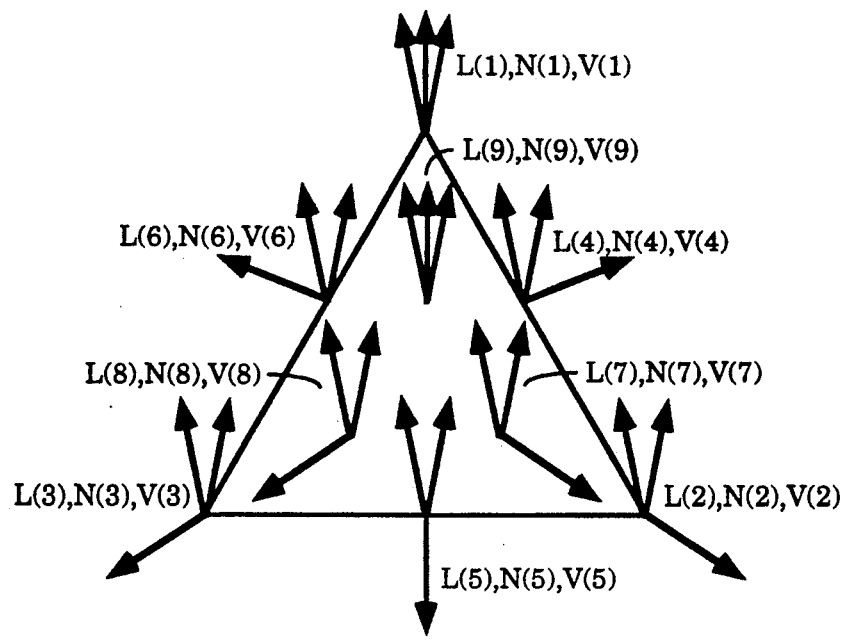
FIGS. 11c and 11d illustrate the vectors and boundary conditions of a second order equation.
Figure 11D:
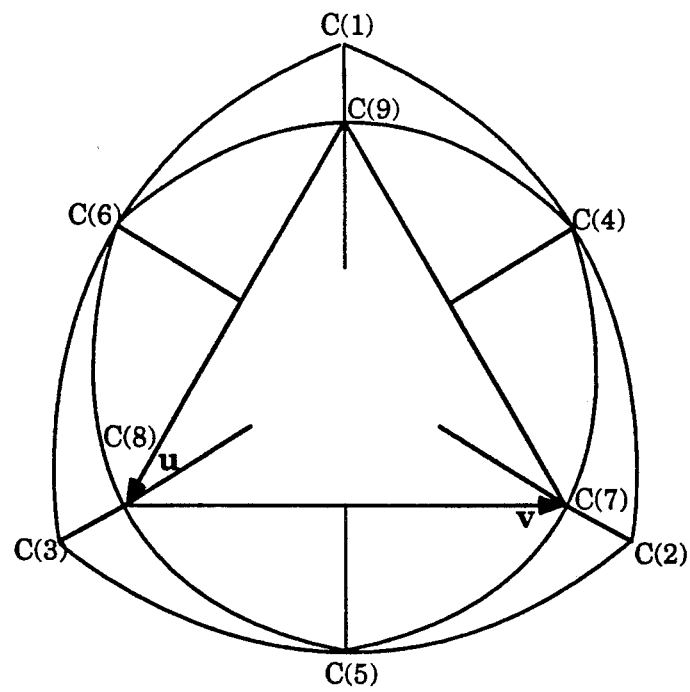

Since a second order solution requires nine boundary conditions, the vectors at nine locations (shown in FIG. 11c) must be determined. The reflection equations (described earlier) are used to calculate the color value at the nine locations. The boundary equations for the (m00, m01, m22) coefficients are then solved. Therefore, the boundary conditions are (referring to FIG. 11d):

$C(1)=m00+m01*u+m02*u^2+m10*v+m11*u*v+m12*u^2v+m20*v^2+m21*u*v^2+m22*u^2*v^2$
where $u=0, v=0$
$C(2)=m00+m01*u+m02*u^2+m10*v+m11*u*v+m12*u^2v+m20*v^2+m21*u*v^2+m22*u^2*v^2$
where $u=1, v=1$
$C(3)=m00+m01*u+m02*u^2+m10*v+m11*u*v+m12*u^2v+m20*v^2+m21*u*v^2+m22*u^2*v^2$
where $u=1, v=1$
$C(4)=m00+m01*u+m02*u^2+m10*v+m11*u*v+m12*u^2v+m20*v^2+m21*u*v^2+m22*u^2*v^2$
where $u=1/2, v=1/2$
$C(5)=m00+m01*u+m02*u^2+m10*v+m11*u*v+m12*u^2v+m20*v^2+m21*u*v^2+m22*u^2*v^2$
where $u=1, v=1/2$
$C(6)=m00+m01*u+m02*u^2+m10*v+m11*u*v+m12*u^2v+m20*v^2+m21*u*v^2+m22*u^2*v^2$
where $u=1/2, v=0$
$C(7)=m00+m01*u+m02*u^2+m10*v+m11*u*v+m12*u^2v+m20*v^2+m21*u*v^2+m22*u^2*v^2$
where $u=2/3, v=2/3$
$C(8)=m00+m01*u+m02*u^2+m10*v+m11*u*v+m12*u^2v+m20*v^2+m21*u*v^2+m22*u^2*v^2$
where $u=2/3, v=1/3$
$C(9)=m00+m01*u+m02*u^2+m10*v+m11*u*v+m12*u^2v+m20*v^2+m21*u*v^2+m22*u^2*v^2$
where $u=1/3, v=1/3$
and thus
$C(1)=1.00*m00$
$C(2)=1.00*m00+1.00*m01+1.00*m02+1.00*m10+1.00*m11+1.00*m12+1.00*m20+1.00*m21+1.00*m22$
$C(3)=1.00*m00+1.00*m01+1.00*m02$
$C(4)=1.00*m00+0.50*m01+0.25*m02+0.50*m10+0.25*m11+0.12*m12+0.25*m20+0.12*m21+0.06*m22$
$C(5)=1.00*m00+1.00*m01+1.00*m02+0.50*m10+0.50*m11+0.50*m12+0.25*m20+0.12*m21+0.25*m22$
$C(6)=1.00*m00+0.50*m01+0.25*m02+1.00*m10+0.50*m11+0.25*m12+1.00*m20+0.50*m21+0.25*m22$
$C(7)=1.00*m00+0.67*m01+0.44*m02+1.67*m10+0.44*m11+0.30*m12+0.40*m20+0.30*m21+0.19*m22$
$C(8)=1.00*m00+0.67*m01+0.44*m02+0.33*m10+0.22*m11+0.15*m12+0.11*m20+0.07*m21+0.05*m22$
$C(9)=1.00*m00+0.33*m01+0.11*m02+0.33*m10+0.11*m11+0.04*m12+0.11*m20+0.04*m21+0.01*m22$ variables are:

| | |
|---|---|
| $u := u+du$ | where $du=1/(Py(2)-Py(1))$ |
| $v := v+dv$ | where $dv=1/(Px(2)-Px(3))$ |

The biquadratic expression for the color then is converted into forward difference equations which are used to interpolate across the triangle.

There are three exceptions to the second order solution. The first situation relates to the function which assures the weights remain positive:

$\cos(\alpha(i)) := \max(\cos(\alpha(i)), 0)$ $\cos(\beta(i)) := \max(\cos(\beta(i)), 0)$ If the diffuse weight is found to be negative, the location in the triangle edge where the value becomes zero is determined. The triangle is divided at this point, tes- $\cos(\alpha(v4)) = 0.995132$ $\cos(\alpha(v5)) = 0.992399.$ The intensity variation is then determined. The maximum difference between the diffuse weights is the metric which predicts the maximum variation:

$dcos(\alpha(t0)) = \max(abs(\cos(\alpha(v0)) - \cos(\alpha(v1))), abs(\cos(\alpha(v1)) - \cos(\alpha(v2))) - abs(\cos(\alpha(v2)) - \cos(\alpha(v0))))$
$dcos(\alpha(t1)) = \max(abs(\cos(\alpha(v0)) - \cos(\alpha(v3))), abs(\cos(\alpha(v3)) - \cos(\alpha(v1))) - abs(\cos(\alpha(v1)) - \cos(\alpha(v0))))$
$dcos(\alpha(t2)) = \max(abs(\cos(\alpha(v1)) - \cos(\alpha(v4))), abs(\cos(\alpha(v4)) - \cos(\alpha(v2))) - abs(\cos(\alpha(v2)) - \cos(\alpha(v1))))$
$dcos(\alpha(t3)) = \max(abs(\cos(\alpha(v0)) - \cos(\alpha(v2))), abs(\cos(\alpha(v2)) - \cos(\alpha(v5))) - abs(\cos(\alpha(v5)) - \cos(\alpha(v0))))$ sellating the triangle into two, three or four triangles. The triangle count depends on whether one, two, or three edges are found to have clamped values.

The second situation occurs when the surface curvature is severe. The metric $\cos(\phi)$ reveals this condition. Since the third order equation may understate the variation of the normal vector across the triangle, the triangle is tessellated into multiple triangles.

The third situation occurs when the light source is close to the triangle. The metric $\cos(\gamma)$ reveals this condition. Since the third order equation may understate the variation of the light vector across the triangle, the triangle is tessellated into multiple triangles.

The following discussion is illustrative of the adaptive shading system of the present invention. This example includes only the diffuse illumination case and does not consider specular illumination. Because specular illumination is not considered it is not necessary to calculate the eyepoint vectors. The image comprises a triangle network consisting of six vertices which create four triangles. This example assumes the color value, $C(i)$, at each vertex is constant, and the light vector, $L(i)$, at each vertex is constant, but the normal vector, $N(i)$, at each vertex varies. The values for the normal vectors are:

$N(v0) = (0.000000, 0.000000, 1.000000)$ $N(v1) = (0.017450, -0.017452, 0.999695)$ $N(v2) = (0.035188, -0.034590, 0.998782)$ $N(v3) = (0.053199, -0.051396, 0.997260)$ $N(v4) = (0.071466, -0.067857, 0.995132)$ $N(v5) = (0.089973, -0.083957, 0.992399).$

The example assumes the light vector is:

$L(vi) = (0, 0, 1).$

The first step is to calculate the diffuse weights according to the equation:

$\cos(\alpha(v)) = N(v) \cdot L(v).$

The values for this example are:

$\cos(\alpha(v0)) = 1.000000$ $\cos(\alpha(v1)) = 0.999695$ $\cos(\alpha(v2)) = 0.998782$ $\cos(\alpha(v3)) = 0.997260$ The values for the maximum variation are:

$\cos_{diff}(\alpha(t0)) = 0.001218$ $\cos_{diff}(\alpha(t1)) = 0.002740$ $\cos_{diff}(\alpha(t2)) = 0.004563$ $\cos_{diff}(\alpha(t3)) = 0.007601.$ The maximum variation is then compared with the first ($\epsilon 1$) and second ($\epsilon 2$) threshold values. In this example the thresholds are:

| | |
|---|---|
| $\epsilon 1 = 0.0025$ | where $\epsilon 1$ separates zero order from first order |
| $\epsilon 2 = 0.0050$ | where $\epsilon 2$ separates first order from second order |

With respect to the first triangle.

$0 < \max(\cos_{diff}(\alpha(t0))) < \epsilon 1.$

A zero order equation is therefore used. To compensate for any differences among the diffuse weights at the three vertices, the values are averaged:

$\cos(\alpha(t0)) = 0.333 * (\cos(\alpha(v0)) + \cos(\alpha(v1)) + \cos(\alpha(v2))).$ The constant color is then determined:

$C(t0) = (Ka + Kd * \cos(\alpha(t0)) * C(t0)).$

With respect to the second and third triangles:

$\epsilon 1 < \max(dcos(\alpha(t1))) < \epsilon 2$ $\epsilon 1 < \max(dcos(\alpha(t2))) < \epsilon 2.$ First order equations are used. The solution, when used with a scan line algorithm, requires the color value along the triangle edges be interpolated first. The color value at the left edge versus right edge across the triangle is then interpolated. For example, with respect to the second triangle:

$C(v0) = (Ka + Kd * \cos(\alpha(v0)) * C(t1))$ $C(v3) = (Ka + Kd * \cos(\alpha(v3)) * C(t1))$ $C(v1) = (Ka + Kd * \cos(\alpha(v1)) * C(t1))$ The scan line logic is then used to interpolate the color value first on the triangle edges, then across the triangle interior.

The maximum variant of the fourth triangle is:

$d\cos(\alpha(t3)) > \epsilon 2.$

Thus, a second order equation (Phong shading) is selected for this triangle. While the technique can exploit the fact that the diffuse weight is already available at the vertices, the normal components on the triangle edges must be propagated. The components at each step are normalized. The normal components across the triangle interior are then propagated and the normal components at each pixel are normalized. The diffuse weight at each pixel is then determined:

$$\cos(\alpha(x,y)) = Lx(x,y)*Nx(x,y) + Ly(x,y)*Ny(x,y) + Lz(x,y)*Nz(x,y)$$

$$C(x,y) = (Ka + Kd * \cos(\alpha(x,y)))*C(t3)$$

where L(x,y) is, by assumption, constant.

While the present invention has been described in conjunction with the preferred embodiments, it is evident that numerous alternatives, modification, variations and uses will be apparent to those skilled in the art in light of the foregoing description. In particular, the present invention can be encompassed shading equations beyond those described. Threshold values can be added to increase the number of tests performed and the number of ordered equations that can be utilized. Alternatively, the system can be configured to utilize only zero order and first order shading equations or first order and second order equations.

We claim:

1. An apparatus for generating shaded images of a graphic image for display on a graphics display device, said graphics display device comprising a matrix of pixels, said graphic image shaded according to a light source, said shaded image generated being of a quality specified by a user, said apparatus comprising a central processing unit (CPU), memory, a frame buffer connected to the graphics display device, said shaded image defined by a plurality of pixel data, said pixel data being stored in the frame buffer, each pixel data comprising a pixel location on the graphics display device and a pixel color, said shaded image being displayed on the graphics display device according to the pixel data stored in the frame buffer, said apparatus further comprising:

a) adaptive shading means coupled to the CPU and the frame buffer, said adaptive shading means comprising;
   1) input means coupled to said CPU to receive a plurality of polygons from said CPU which define the graphic image, each of said polygons having a plurality of vertices, each of said vertices having a location, each of said polygons being defined by the location of the polygon's vertices and a normal vector at each vertex, said normal vector at each vertex being a normal vector to a surface of the polygon at the vertex;
   2) selection means for selecting an ordered reflection equation from a set of at least three ordered reflection equations, said ordered reflection equation to be employed to determine a reflection across each polygon, wherein an ordered reflection equation of a highest order generates the reflection of a highest quality across the polygon, said selection means comprising;
      i) variation determining means for determining an amount of variation of a predetermined graphic criteria in said polygons and;
      ii) comparison means for comparing the determined amount of variation to a graphic criteria threshold value indicative of a large amount of variation, if the amount of variation exceeds the threshold value, a control means selects a predetermined high order reflection equation;
   3) reflection determination means for determining a reflection across the polygon, said reflection determination means receiving the ordered reflection equation determined by the selection means and employing the ordered reflection equation to determined the reflection across the polygon and generate a plurality of modified pixel data representative of a shaded polygon image;
   4) output means connected to the frame buffer to output the plurality of modified pixel data representative of the shaded polygon to the frame buffer; and
   b) display control means connected to the frame buffer and the graphics display device to read the plurality of modified pixel data stored in the frame buffer and enable corresponding pixels on the graphics display at a color specified by the plurality of modified pixel data to generate the shaded polygon image on the display;
whereby the apparatus selects the order of the reflection equation for each polygon of the graphic image according to graphic criteria variation and a use of costly, time consuming higher order reflection equations is minimized and higher order equations are used only when measurements indicate that a variation of measurements across a polygon is great enough to warrant use of a higher order equation.

2. The apparatus according to claim 1 wherein said reflection determination means determines the reflection across the polygon using forward differencing for rendering images.

3. The apparatus according to claim 2 wherein said reflection determination means determines the reflection across the polygon using a scan line equation for rendering images.

4. The apparatus according to claim 3 wherein said reflection determination means comprises:
   means for determining the reflection at each vertex of the polygon according to the reflection equation received;
   means for determining difference variables between adjacent polygon vertices, said difference variables comprising a normal difference variable which comprises the difference between adjacent vertex normals, a position difference variable which comprises the difference between locations of adjacent vertices, and a color difference variable which is the difference between the color defined by the pixel data at adjacent vertices;
   means for interpolating the reflection determined at each vertex across the polygon using the difference variables to determine the reflection and modified pixel data of pixels across the polygon.

5. The apparatus according to claim 2 wherein said reflection determination means determines the reflection across the polygon using a plane equation for rendering images.

6. The apparatus as set forth in claim 1, wherein:

said variation determining means comprises curvature determining means to determine an amount of curvature variation across the surface of the polygon and a curvature variation between vertices according to the normal vectors at the vertices of the polygon; and said comparison means comprises curvature comparison means for comparing the amount of curvature variation between the vertices to a curvature threshold value indicative of a large amount of curvature variation, such that if the amount of curvature variation between vertices is greater than or equal to the curvature threshold value, the control means selects the highest order reflection equation.

7. The apparatus as set forth in claim 6, wherein:

said variation determining means further comprises light vector determining means to determine a light vector at each vertex and light vector variation among vertices, said light vectors being a function of the normal vector at each vertex and a location of the light source relative to the vertex;

said comparison means further comprises light vector comparison means for comparing a light vector variation between vertices to a light vector threshold value indicative of a large amount of variation between light vectors, if the amount of light vector variation between vertices is greater than or equal to the light vector threshold value, the control means selects the highest order reflection equation; and said selection means further comprises;

maximum variation determining means to determine a maximum variation among the curvature variation between vertices and light vector variation between vertices, and maximum variation comparison means for comparing the maximum variation to a plurality of threshold values which are used to determine the order of the reflection equation to be used, each threshold value delineating a maximum variation value at which a reflection equation of a predetermined order can be used to generate a quality image, if said control means has not selected an ordered reflection equation, said control means selecting a reflection equation of a predetermined order if the maximum variation is less than or equal to the threshold value delineating the maximum variation at which the reflection equation of the predetermined order can be used to generate a quality image and greater than the threshold value which delineates maximum variation at which a reflection equation of an adjacent lower predetermined order can be used to generate a quality image.

8. The apparatus of claim 7, wherein at least four orders of reflection equations are utilized.

9. The apparatus of claim 7, wherein the highest order reflection equation to be used is a second order equation.

10. The apparatus of claim 9, wherein the curvature threshold value corresponds to the maximum curvature variation for which a quality image can be generated using a first order equation.

11. The apparatus of claim 9, wherein the light vector threshold value corresponds to a maximum light vector variation for which a quality image can be generated using a first order equation.

12. The apparatus of claim 9, wherein;

said maximum variation comparison means compares the maximum variation to a first threshold value and a second threshold value, the first threshold value being the maximum variation for which a zero order reflection equation can be used to generate a quality shaded image and said second threshold value being the maximum variation for which a first order reflection equation can be used to generate a quality shaded image; and said control means selecting a zero order reflection equation to be used to compute the reflection across the polygon if the maximum variation is less than or equal to the first threshold value, a first order reflection equation to be used to compute the reflection across the polygon if the maximum variation is greater than the first threshold value and less than or equal to the second threshold value, and a second order reflection equation to be used to compute the reflection across the polygon when the maximum variation is greater then the second threshold value.

13. The apparatus of claim 9 wherein zero, first and second order reflection equations are used;

said zero order equation comprising a dot product, $L \cdot N$, where L is an average light vector and N is an average normal vector to the surface;

said first order equation comprising, $$C = (Ka + Kd^* \cos(a))^* C_p$$

where C is the pixel color, Ka is an ambient weight, Kd is a diffuse weight and cos (a) is equal to the dot product $L \cdot N$, Cp is a polygon color;

said second order equation comprising, $$C = (Ka + Kd^* \cos(a(x,y)))^* C_p$$

where C is the pixel color, Cp is a polygon color, Ka is the ambient weight, Kd is the diffuse weight and cos (a(x,y)) is equal to $L(x,y) \cdot N(x,y)$ and L(x,y) represents a normalized light vector and N(x,y) represents a normalized normal vector to the surface.

14. The apparatus according to claim 13 wherein the zero order, first order and second order reflection equations are stored in the memory and said control means retrieves the selected reflection equation and outputs the selected reflection equation to the reflection determination means.

15. The apparatus of claim 7, said selection means further comprising:

eyepoint vector determining means to determine an eyepoint vector at each vertex and an eyepoint vector variation between vertices, said eyepoint vectors being a function of a location of an eyepoint relative to a location of the vertex;

eyepoint vector comparison means for comparing the eyepoint vector variation between vertices to an eyepoint vector threshold value indicative of a large amount of variation between eyepoint vectors;

if an amount of eyepoint vector variation between vertices is greater than or equal to the eyepoint vector threshold value, the control means selects reflection equation of a highest order; and said maximum variation determining means determines the maximum variation among; the curvature variation between vertices, the light vector variation between vertices and the eyepoint vector variation between vertices.

16. The apparatus of claim 15, wherein the highest order reflection equation to be used is a second order equation and the eyepoint vector threshold value corresponds to a maximum eyepoint vector variation for which a quality image can be generated using a first order equation.

17. The apparatus according to claim 15, wherein the polygon comprises a triangle having a first, second and third vertex, and wherein said eyepoint vector determining means determines a maximum eyepoint vector variation (cos ($\eta$)) according to:

$$\cos(\eta) = \max(\cos(\eta(1)), \cos(\eta(2)), \cos(\eta(3)))$$

where $$\cos(\eta(1)) = Vx(1)*Vx(2) + Vy(1)*Vy(2) + Vz(1)*Vz(2)$$

$$\cos(\eta(2)) = Vx(2)*Vx(3) + Vy(2)*Vy(3) + Vz(2)*Vz(3)$$

$$\cos(\eta(3)) = Vx(3)*Vx(1) + Vy(3)*Vy(1) + Vz(3)*Vz(1)$$

where Vx(1), Vy(1), Vz(1) are the x, y and z components of the eyepoint vector at the first vertex, Vx(2), Vy(2), Vz(2) are the x, y and z components of the eyepoint vector at the second vertex, Vx(3), Vy(3), Vz(3) are the x, y and z components of the eyepoint vector at the third vertex, cos ($\eta(1)$) is indicative of the eyepoint vector variation between the first vertex and second vertex, cos ($\eta(2)$) is indicative of the eyepoint vector variation between the second vertex and third vertex, and cos ($\eta(3)$) is indicative of the eyepoint vector variation between the third vertex and first vertex; and said eyepoint vector comparison means comparing the maximum eyepoint vector variation to the eyepoint threshold value.

18. The apparatus according to claim 15, wherein the polygon comprises a triangle having a first, second and third vertex, and the maximum variation is determined according to:

$$\cos(\phi\psi\eta) = \min(a(\phi)*\cos(\phi), a(\psi)*\cos(\psi), a(\eta)*\cos(\eta))$$

where cos ($\phi$) is the maximum curvature variation and a($\phi$) is a curvature weight, cos ($\psi$) is the maximum light vector variation and a($\psi$) is the light vector weight, and cos ($\eta$) is the maximum eyepoint vector variation and a($\psi$) is the eyepoint vector weight.

19. The apparatus of claim 18 wherein the first threshold value is in the range of 0.996 to 0.938 and the second threshold value is in the range of 0.938 to 0.879.

20. The apparatus according to claim 7, wherein the polygon comprises a triangle having a first, second and third vertex.

21. The apparatus according to claim 20 wherein;
said curvature determining means determines a maximum curvature variation (cos ($\phi$)) between vertices according to:

$$\cos(\phi) = \min(\cos(\phi(1)), \cos(\phi(2)), \cos(\phi(3)))$$

where $$\cos(\phi(1)) = Nx(1)*Nx(2) + Ny(1)*Ny(2) + Nz(1)*Nz(2)$$

$$\cos(\phi(2)) = Nx(2)*Nx(3) + Ny(2)*Ny(3) + Nz(2)*Nz(3)$$

$$\cos(\phi(3)) = Nx(3)*Nx(1) + Ny(3)*Ny(1) + Nz(3)*Nz(1)$$

where Nx(1), Ny(1), Nz(1) are the x, y and z components of the vertex normal at the first vertex, Nx(2), Ny(2), Nz(2) are the x, y and z components of the vertex normal at the second vertex, Nx(3), Ny(3), Nz(3) are the x, y and z components of the vertex normal at the third vertex, cos ($\phi(1)$) is indicative of the curvature variation between the first vertex and second vertex, cos ($\phi(2)$) is indicative of the curvature variation between the second vertex and third vertex, and cos ($\phi(3)$) is indicative of the curvature variation between the third vertex and first vertex; and said curvature comparison means comparing the maximum curvature variation to the curvature threshold value.

22. The apparatus according to claim 20, wherein said light vector determining means determines a maximum light vector variation (cos ($\psi$)) according to:

$$\cos(\psi) = \min(\cos(\psi(1)), \cos(\psi(2)), \cos(\psi(3)))$$

where $$\cos(\psi(1)) = Lx(1)*Lx(2) + Ly(1)*Ly(2) + Lz(1)*Lz(2)$$

$$\cos(\psi(2)) = Lx(2)*Lx(3) + Ly(2)*Ly(3) + Lz(2)*Lz(3)$$

$$\cos(\psi(3)) = Lx(3)*Lx(1) + Ly(3)*Ly(1) + Lz(3)*Lz(1)$$

where Lx(1), Ly(1), Lz(1) are the x, y and z components of the light vector at the first vertex, Lx(2), Ly(2), Lz(2) are the x, y and z components of the light vector at the second vertex, Lx(3), Ly(3), Lz(3) are the x, y and z components of the light vector at the third vertex, cos ($\psi(1)$) is indicative of the light vector variation between the first vertex and second vertex, cos ($\psi(2)$) is indicative of the light vector variation between the second vertex and third vertex, and cos ($\psi(3)$) is indicative of the light vector variation between the third vertex and first vertex; and said light vector comparison means comparing the maximum light vector variation to the light vector threshold value.

23. The apparatus of claim 7, wherein the highest order reflection equation to be used is a second order equation and the maximum variation is determined according to:

$$\cos(\phi\psi) = \min(a(\phi)*\cos(\phi), a(\psi)*\cos(\psi))$$

where cos ($\phi$) is the maximum curvature variation and a ($\phi$) is a curvature weight, cos ($\psi$) is the maximum light vector variation and a($\psi$) is the light vector weight.

24. The apparatus of claim 23 wherein the first threshold value is the range of 0.996 to 0.938 and the second threshold value is the range of 0.938 to 0.879.

25. The apparatus as set forth in claim 1, wherein:
said variation determining means comprises light vector determining means to determine a light vector at each vertex and light vector variation among vertices, said light vectors being a function of the normal vector at each vertex and a location of the light source relative to the vertex; and said comparison means comprises light vector comparison means for comparing a light vector variation between vertices to a light vector threshold value indicative of a large amount of variation between light vectors, such that if the amount of light vector variation between vertices is greater than or equal to the light vector threshold value, the control means selects the highest order reflection equation.

26. The apparatus as set forth in claim 1, wherein;

said variation determining means comprises eyepoint vector determining means to determine an eyepoint vector at each vertex and an eyepoint vector variation between vertices, said eyepoint vectors being a function of a location of an eyepoint relative to a location of the vertex; and said comparison means comprises eyepoint vector comparison means for comparing the eyepoint vector variation between vertices to an eyepoint vector threshold value indicative of a large amount of variation between eyepoint vectors;

such that if an amount of eyepoint vector variation between vertices is greater than or equal to the eyepoint vector threshold value, the control means selects reflection equation of a highest order.

27. The apparatus as set forth in claim 1, wherein;

said variation determining means comprises light vector determining means to determine a light vector at each vertex, and diffuse reflection determining means for determining a dot product of the normal at each vertex and the light vector at each vertex and a maximum difference in value between the dot products at the vertices; and said comparison means comprises diffuse comparison means for comparing the maximum difference between dot products at the vertices to at least a first threshold value and second threshold value, said first threshold value indicative of a variation of reflection across the surface of the polygon which requires a reflection equation of at least a first predetermined order to be used, and a second threshold value indicative of a variation of reflection across the surface of the polygon which requires reflection equation of at least a second predetermined order higher than the first predetermined order to be used;

such that if the maximum difference between dot products at the vertices is less than or equal to the first threshold value, the control means selects the reflection equation of a predetermined order lower than the first predetermined order;

if the maximum difference between dot products at the vertices is greater than the first threshold value and less than or equal to the second threshold value, the control means selects the reflection equation of the first predetermined order; and if the maximum difference between dot products at the vertices is greater than the second threshold value, the control means selects the reflection equation of the second predetermined order.

28. The apparatus of claim 27, wherein the highest order reflection equation to be used is a second order equation.

29. The apparatus of claim 28 wherein the second threshold value is set to a value in the range of 0.9 to 0.6.

30. The apparatus of claim 28 wherein the first threshold value is set to a value approximately equal to 0.1.

31. The apparatus according to claim 28, wherein the zero order, first order and second order refection equations are shared in the memory and said control means retrieves the selected reflection equation and outputs the selected refection equation to the reflection determination means.

32. The apparatus according to claim 27, wherein the polygon comprises a triangle having a first, second and third vertex.

33. The apparatus according to claim 27 wherein said reflection determination means determines the reflection across the polygon surface using forward differencing for rendering images.

34. The apparatus according to claim 33 wherein said reflection determination means determines the reflection across the polygon using plane equations for rendering images.

35. The apparatus according to claim 34 wherein said reflection determination means comprises:

means for determining the refection at each vertex of the polygon according to the reflection equation received;

means for determining difference variables between adjacent polygon vertices, said difference variables comprising a normal difference variable which comprises the difference between adjacent vertex normals, a position difference variable which comprises the difference between locations of adjacent vertices, and a color difference variable which is the difference between the color defined by the pixel data at adjacent vertices;

means for interpolating the reflection determined at each vertex across the polygon using the difference variables to determine the reflection and modified pixel data of pixels across the polygon.

36. The apparatus as set forth in claim 1, wherein;

said variation determining means comprises;

eyepoint vector determining means to determine a eyepoint vector at each vertex;

reflection vector determining means to determine the reflection vector at each vertex, said reflection vector being the vector the light reflects off the surface of the polygon; and specular reflection determining means for determining the dot product of the reflection vector at each vertex and the eyepoint vector at each vertex and a maximum difference in value between the dot products at each vertex; and said comparison means comprises specular comparison means for comparing the differences between dot products at the vertices to at least a first threshold value and a second threshold value, said first threshold value indicative of a variation of reflection across the surface of the polygon which requires a reflection equation of at least a first predetermined order to be used, and a second threshold value indicative of a variation of reflection across the surface of the polygon which requires reflection equation of at least a second predetermined order higher than the first predetermined order to be used;

such that if the maximum difference between dot products at the vertices is less than or equal to the first threshold value, the control means selects the reflection equation of a predetermined order lower than the first predetermined order;

if the maximum difference between dot products at the vertices is greater than the first threshold value and less than or equal to the second threshold value, the control means selects the reflection equation of the first predetermined order; and if the maximum difference between dot products at the vertices is greater than the second threshold value, the control means selects the reflection equation of the second predetermined order.

37. The apparatus of claim 36, wherein the highest order reflection equation to be used is a second order equation.

38. The apparatus according to claim 37, wherein the zero order, first order and second order reflection equations are stored in memory and said control means retrieves a selected reflection equation and outputs the selected reflection equation to the reflection determination means.

39. The apparatus of claim 36, wherein the refection equation of the second predetermined order is a second order reflection equation, the refection equation of the first predetermined order is a first order reflection equation, and the reflection equation of a predetermined order lower than the first predetermined order is a zero order reflection equation.

40. The apparatus of claim 36, further comprising threshold setting means selectable by the user such that the user can set the thresholds according to a desired quality.

41. The apparatus of claim 40, wherein if it is desirable to quickly render a shaded image, said first and second thresholds are set by said threshold setting means to be low values such that the polygon is rendered using a zero or first order reflection equation.

42. The apparatus according to claim 36 wherein the polygon comprises a triangle having a first, second and third vertex.

43. The apparatus according to claim 36, wherein said reflection determination means determines the reflection across the polygon surface using forward differencing for rendering images.

44. The apparatus according to claim 36, wherein said reflection determination means determines the reflection across the polygon using plane equations for rendering images.

45. The apparatus as set forth in claim 1, wherein;
said variation determining means comprises;
light vector determining means to determine a light vector at each vertex and light vector variation among vertices, said light vector being a function of the normal vector at each vertex and a location of a light source relative to each vertex; and
diffuse reflection determining means for determining a dot product of the normal at each vertex and the light vector at each vertex and a maximum difference in value between the dot products at the vertices;
said comparison means comprises;
diffuse comparison means for comparing the maximum difference between the dot products at the vertices to at least a first threshold value and second threshold value, said first threshold value indicative of a variation of reflection across the surface of the polygon which requires a reflection equation of at least a first predetermined order to be used, and a second threshold value indicative of a variation of reflection across the surface of the polygon which requires reflection equation of at least a second predetermined order higher than the first predetermined order to be used;

such that if the maximum difference between dot products at the vertices is less than or equal to the first threshold value, a control means selects the reflection equation of a predetermined order lower than the first predetermined order; and if the maximum difference between dot products at the vertices is greater than the first threshold value and less than or equal to the second threshold value, the control means selects the reflection equation of the first predetermined order;

said selection means further comprises;
curvature determining means to determine an amount of curvature variation across the surface of the polygon and a curvature variation between vertices according to normal vectors at the vertices of the polygon;
curvature comparison means for comparing the amount of curvature variation between the vertices to a curvature threshold value indicative of a large amount of curvature variation, if the amount of curvature variation between vertices is greater than or equal to the curvature threshold value, the control means selects the highest order reflection equation;
light vector comparison means for comparing the light vector variation between vertices to a light vector threshold value indicative of a large amount of variation between light vectors, if the amount of light vector variation between vertices is greater than or equal to the light vector threshold value, the control means selects the highest order reflection equation;
maximum variation determining means to determine a maximum variation among the curvature variation between vertices and a light vector variation between vertices; and
maximum variation comparison means for comparing the maximum variation to a plurality of threshold values which are used to determine the order of the reflection equation, each threshold value delineating a maximum variation value at which a reflection equation of a predetermined order can be used to generate a quality image, if said control means has not selected an ordered reflection equation then said control means selecting a reflection equation of a predetermined order if the maximum variation is less than or equal to the threshold value delineating maximum variation at which the reflection equation of the predetermined order can be used to generate a quality image and greater than the threshold value which delineates maximum variation at which an adjacent reflection equation of a lower predetermined order can be used to generate a quality image;

wherein an ordered reflection equation is selected.

46. The apparatus of claim 45, wherein the highest order reflection equation to be used is a second order equation.

47. The apparatus of claim 46, wherein the curvature threshold value corresponds to the maximum curvature variation for which a quality image can be generated using a first order equation.

48. The apparatus of claim 46, wherein the light vector threshold value corresponds to a maximum light vector variation for which a quality image can be generated using a first order equation.

49. The apparatus of claim 45, said selection means further comprising: eyepoint vector determining means to determine an eyepoint vector at each vertex and eyepoint vector variation between vertices, said eyepoint vectors being a function of a location of the eyepoint relative to the location of the vertex;

eyepoint vector comparison means for comparing the eyepoint vector variation between vertices to an eyepoint vector threshold value indicative of a large amount of variation between eyepoint vectors;

if the amount of eyepoint vector variation between vertices is greater than or equal to the eyepoint vector threshold value, the control means selects the reflection equation of the highest order; and said maximum variation determining means determines the maximum variation among the curvature variation between vertices, the light vector variation between vertices and the eyepoint vector variation between vertices.

50. The apparatus of claim 49, wherein the highest order reflection equation to be used is a second order equation and the eyepoint vector threshold value corresponds to a maximum eyepoint vector variation for which a quality image can be generated using a first order equation.

51. The apparatus as set forth in claim 1, wherein;
said variation determining means comprises;
   eyepoint vector determining means to determine a eyepoint vector at each vertex;
   reflection vector determining means to determine a reflection vector at each vector vertex, said reflection vector being a vector the light reflects off said surface of said polygon; and
   specular reflection determining means for determining a dot product of the reflection vector at each vertex and the eyepoint vector at each vertex and a maximum difference in value between the dot products at each vertex;
said comparison means comprises;
   specular comparison means for comparing the differences between dot products at the vertices to at least a first threshold value and a second threshold value, said first threshold value indicative of a variation of reflection across the surface of the polygon which requires a reflection equation of at least a first predetermined order to be used, and a second threshold value indicative of a variation of reflection across the surface of the polygon which requires reflection equation of at least a second predetermined order higher than the first predetermined order to be used;
   such that if the maximum difference between the dot products at the vertices is less than or equal to the first threshold value, the control means selects the reflection equation of a predetermined order lower than the first predetermined order; and
   if the maximum difference between dot products at the vertices is greater than the first threshold value and less than or equal to the second threshold value, the control means selects a reflection equation of the first predetermined order;
said selection means further comprising;

curvature determining means to determine an amount of curvature variations across the surface of the polygon and a curvature variation between vertices according to the normal vectors at the vertices of the polygon;
   curvature comparison means for comparing the amount of curvature variation between the vertices to a curvature threshold value indicative of a large amount of curvature variation, if the amount of curvature variation between vertices is greater than or equal to the curvature threshold value, the control means selects a highest order reflection equation;
   light vector comparison means for comparing a light vector variation between vertices to a light vector threshold value indicative of a large amount of variation between light vectors, if an amount of light vector variation between vertices is greater than or equal to the light vector threshold value, the control means selects the highest order reflection equation;
   maximum variation determining means to determine a maximum variation among the curvature variation between vertices and light vector variation between vertices; and
   maximum variations comparison means for comparing the maximum variations to a plurality of threshold values which are used to determine an order of reflection equation to be used, each threshold value delineating the maximum variation at which a reflection equation of a predetermined order can be used to generate a quality image, if said control means has not selected an ordered reflection equation then said control means selecting a reflection equation of a predetermined order if the maximum variation is less than or equal to the threshold value delineating maximum variation at which the reflection equation of a first predetermined order can be used to generate a quality image and greater than the threshold value which delineates maximum variation at which a reflection equation of a predetermined order lower than the first predetermined order can be used to generate a quality image.

52. In a graphics display system comprising a CPU, memory, a frame buffer, and a graphics display device connected to the frame buffer for displaying graphic images, said graphics display device comprising a matrix of pixels, said graphic image defined by a plurality of pixel data, said pixel data being stored in the frame buffer, each pixel data comprising a pixel location on the graphics display device and a pixel color said graphic image being displayed on the graphics display device according to the pixel data stored in the frame buffer, an adaptive process for generating a shaded graphic image, said graphic image shaded according to a light source, said shaded image generated being of a quality specified by a user, said process comprising the steps of:
   a) receiving a plurality of polygons which define the graphic image, each of said polygons having a plurality of vertices, each of said vertices having a location, each of said polygons being defined by a location of the polygon's vertices and a normal vector at each vertex, said normal vector at each vertex being a normal vector to the surface of the polygon at the vertex;
   b) selecting an ordered reflection equation from a set of at least three ordered reflection equations, said ordered reflection equation to be employed to determine a reflection across each polygon, wherein an ordered reflection equation of a highest order generates the reflection of a highest quality across the polygon, said step od selecting comprising the subjects of;

1) determining the amount of variation of a predetermined graphic criteria in said polygons and;
2) comparing the determine amount of variation to a graphic criteria threshold value indicative a large amount of variation, such that if the amount of variation exceeds the threshold value, a control means selects a predetermined higher order reflection equation;

c) determining a reflection across the polygon employing the ordered reflection equation selected to determine the reflection across the polygon and generating a plurality of modified pixel data representative of a shaded polygon image;

d) outputting the plurality of modified pixel data representative of the shaded polygon to the frame buffer; and e) reading the plurality of modified pixel data stored in the frame buffer and enabling corresponding pixels on the graphics display device at a color specified by the plurality of modified pixel data to generate the shaded polygon image on the graphics display device;

whereby the order of the reflection equation for each polygon of the graphic image is selected according to the amount of variation and a use of costly, time consuming higher order reflection equations is minimized and higher order equations are used when measurements indicate that a variation of measurements across the polygon is great enough to warrant use of a higher order equation.

53. The adaptive shading process of claim 52, wherein at least four orders of reflection equations are utilized.

54. The adaptive shading process of claim 52, wherein the highest order reflection equation to be used is a second order equation.

55. The method as set forth in claim 52, wherein; said step of determining the amount of variation of a predetermined graphic criteria comprises the step of determining an amount of curvature variation across the surface of the polygon and a curvature variation between vertices according to normal vectors at the vertices of the polygon; and said step of comparing comprises the step of comparing the amount of curvature variation between the vertices to a curvature threshold value indicative of a large amount of curvature variation, if the amount of curvature variation between vertices is greater than or equal to the curvature threshold value, selecting the predetermined higher order reflection equation.

56. The method as set forth in claim 52, wherein; said step of determining the amount of variation of a predetermined graphic criteria comprises the step of determining a light vector at each vertex and light vector variation among vertices, said light vectors being a function of the normal vector at each vertex and location of the light source relative to the vertex;

said step of comparing comprising the step of comparing the light vector variation between vertices to a light vector threshold value indicative of a large amount of variation between light vectors, such that if the amount of light vector variation between vertices is greater than or equal to the light vector threshold value, selecting the predetermined higher order reflection equation.

57. The adaptive shading process according to claim 56, wherein the polygon comprises a triangle having a first, second and third vertex.

58. The adaptive shading process according to claim 57, wherein the step of determining a light vector at each vertex and light vector variation among vertices comprises determining a maximum light vector variation (cos ($\psi$)) according to:

$$\cos(\psi) = \min(\cos(\psi(1)), \cos(\psi(2)), \cos(\psi(3)))$$

where $$\cos(\psi(1)) = Lx(1)*Lx(2) + Ly(1)*Ly(2) + Lz(1)*Lz(2)$$

$$\cos(\psi(2)) = Lx(2)*Lx(3) + Ly(2)*Ly(3) + Lz(2)*Lz(3)$$

$$\cos(\psi(3)) = Lx(3)*Lx(1) + Ly(3)*Ly(1) + Lz(3)*Lz(1)$$

where Lx(1), Ly(1), Lz(1) and the x, y and z components of the light vector at the first vertex, Lx(2), Ly(2), Lz(2) are the x, y and z components of the light vector at the second vertex, Lx(3), Ly(3), Lz(3) are the x, y and z components of the light vector at the third vertex, cos ($\psi(1)$) is indicative of the light vector variation between the first vertex and second vertex, cos ($\psi(2)$) is indicative of the light vector variation between the second vertex and third vertex, and cos ($\psi(3)$) is indicative of the light vector variation between the third vertex and first vertex;

wherein the maximum light vector variation is compared to the light vector threshold value.

59. The adaptive shading process of claim 56 wherein the first threshold value is in the range of 0.996 to 0.938 and the second threshold value is in the range of 0.938 to 0.879.

60. The method as set forth in claim 52, wherein; said step of determining the amount of variation of a predetermined graphic criteria comprises the steps of;

determining an amount of curvature variation across the surface of the polygon and a curvature variation between vertices according to normal vectors at the vertices of the polygon; and determining a light vector at each vertex and light vector variation among vertices, said light vectors being a function of the normal vector at each vertex and location of the light source relative to the vertex;

said step of comparing comprises the steps of;

comparing the amount of curvature variation between the vertices to a curvature threshold value indicative of a large amount of curvature variation, if the amount of curvature variation between vertices is greater than or equal to the curvature threshold value, selecting the predetermined higher order reflection equation;

if the predetermined high order reflection equation is not selected, comparing the light vector variation between vertices to a light vector threshold value indicative of a large amount of variation between light vectors, such that if the amount of light vector variation between vertices is greater than or equal to the light vector threshold value, selecting the higher order reflection equation;

said method further comprising the steps of;

if the predetermined high order reflection equation is not selected, determining a maximum variation among the curvature variation between vertices and light vector variation between vertices; and comparing the maximum variation to a plurality of threshold values which are used to determine the order of the reflection equation to be used, each threshold value delineating a maximum variation value at which a reflection equation of a predetermined order can be used to generate a quality image, selecting reflection equation of a predetermined order if the maximum variation is less than or equal to the threshold value delineating maximum variation at which the reflection equation of the predetermined order can be used to generate a quality image and greater than the threshold value which delineates maximum variation at which a reflection equation of an adjacent lower predetermined order can be used to generate a quality image.

61. The adaptive shading process of claim 60, wherein said step of selecting further comprises the substeps of:

determining an eyepoint vector at each vertex and eyepoint vector variation between vertices, said eyepoint vectors being a function of a location of an eyepoint relative to a location of the vertex;

comparing the eyepoint vector variation between vertices to an eyepoint vector threshold value indicative of a large amount of variation between eyepoint vectors;

if the amount of eyepoint vector variation between vertices is greater than or equal to the eyepoint vector threshold value, selecting the reflection equation of the highest order completing said step of selecting an ordered reflection equation; and the step of determining the maximum variation determines the maximum variation among the curvature variation between vertices, the light vector variation between vertices and the eyepoint vector variation between vertices.

62. The adaptive shading process according to claims 57 wherein;

the step of determining the amount of curvature variation across the surface of the polygon and the curvature variation between vertices comprises the step of determining a maximum curvature variation ($\cos (\phi)$) between vertices according to:

$$\cos (\phi) = \min(\cos \psi(1)), \cos (\phi(2)), \cos (\phi(3)))$$

where $$\cos (\phi(1)) = Nx(1)*Nx(2) + Ny(1)*Ny(2) + Nz(1)*Nz(2)$$

$$\cos (\phi(2)) = Nx(2)*Nx(3) + Ny(2)*Ny(3) + Nz(2)*Nz(3)$$

$$\cos (\phi(3)) = Nx(3)*Nx(1) + Ny(3)*Ny(1) + Nz(3)*Nz(1)$$

where $Nx(1)$, $Ny(1)$, $Nz(1)$ are the x, y and z components of the vertex normal at the first vertex, $Nx(2)$, $Ny(2)$, $Nz(2)$ are the x, y and z components of the vertex normal at the second vertex, $Nx(3)$, $Ny(3)$, $Nz(3)$ are the x, y and z components of the vertex normal at the third vertex, $\cos (\phi(1))$ is indicative of the curvature variation between the first vertex and second vertex, $\cos (\phi(2))$ is indicative of the curvature variation between the second vertex and third vertex, and $\cos (\phi(3))$ is indicative of the curvature variation between the third vertex and first vertex;

wherein the maximum curvature variation is compared to the curvature threshold value.

63. The adaptive shading process according to claim 61, wherein the polygon comprises a triangle having a first, second and third vertex and wherein the step of determining an eyepoint vector at each vertex and eyepoint vector variation between vertices determines a maximum eyepoint vector variation ($\cos (\eta)$) according to:

$$\cos (\eta) = \min(\cos (\eta(1)), \cos (\eta(2)), \cos (\eta(3)))$$

where $$\cos (\eta(1)) = Vx(1)*Vx(2) + Vy(1)*Vy(2) + Vz(1)*Vz(2)$$

$$\cos (\eta(2)) = Vx(2)*Vx(3) + Vy(2)*Vy(3) + Vz(2)*Vz(3)$$

$$\cos (\eta(3)) = Vx(3)*Vx(1) + Vy(3)*Vy(1) + Vz(3)*Vz(1)$$

where $Vx(1)$, $Vy(1)$, $Vz(1)$ are the x, y and z components of the eyepoint vector at the first vertex, $Vx(2)$, $Vy(2)$, $Vz(2)$ are the x, y and z components of the eyepoint vector at the second vertex, $Vx(3)$, $Vy(3)$, $Vz(3)$ are the x, y and z components of the eyepoint vector at the third vertex, $\cos (\eta(1))$ is indicative of the eyepoint vector variation between the first vertex and second vertex, $\cos (\eta(2))$ is indicative of the eyepoint vector variation between the second vertex and third vertex, and $\cos (\eta(3))$ is indicative of the eyepoint vector variation between the third vertex and first vertex;

whereby the maximum eyepoint vector variation is compared to the eyepoint threshold value.

64. The adaptive shading process according to claim 61, wherein the polygon comprises a triangle having a first, second and third vertex, and the maximum variation is determined according to $$\cos (\phi\psi\eta) = \min(a(\phi)* \cos (\phi), a(\psi)*\cos (\psi), a(\eta)* \cos (\eta))$$

where $\cos (\phi)$ is the maximum curvature variation and $a(\phi)$ is a curvature weight, $\cos (\psi)$ is the maximum light vector variation and $a(\psi)$ is the light vector weight, and $\cos (\eta)$ is the maximum eyepoint vector variation and $a(\eta)$ is the eyepoint vector weight.

65. The adaptive shading process of claim 61 wherein the first threshold value is in the range of 0.996 to 0.938 and the second threshold value is in the range of 0.938 to 0.879.

66. The adaptive process of claim 60, wherein the maximum variation is determined according to $$\cos (fy) = \min(a(f), a(y)* \cos (y))$$

where $\cos (f)$ is the maximum curvature variation and $a(f)$ is a curvature weight, $\cos (y)$ is the maximum light vector variation and $a(y)$ is the light vector weight.

67. The method as set forth in claim 52, wherein;

said step of determining the amount of variation of a predetermined graphic criteria comprises the step of determining an eyepoint vector at each vertex and eyepoint vector variation between vertices, said eyepoint vectors being a function of a location of an eyepoint relative to a location of the vertex; and said step of comparing comprising the step of comparing the eyepoint vector variation between vertices to an eyepoint vector threshold value indicative of a large amount of variation between eyepoint vectors, such that if the amount of eyepoint vector variation between vertices is greater than or equal to the eyepoint vector threshold value, selecting the reflection equation of the predetermined higher order.

68. The method as set forth in claim 52, wherein said step of selecting comprises the steps of:

determining a light vector at each vertex;

determining a dot product of the normal at each vertex and the light vector at each vertex, and a maximum difference in value between the dot products at the vertices;

comparing the maximum difference between the dot products at the vertices to at least a first threshold value and a second threshold value, said first threshold value indicative of a variation of reflection across the surface of the polygon which requires a reflection equation of at least a first predermined order to be used, and a second threshold value indicative of a variation of reflection across the surface of the polygon which requires reflection equation of at least a second predetermined order higher than the first predetermined order to be used;

if the maximum difference between the dot products at the vertices is less than or equal to the first threshold value, selecting the reflection equation of a predetermined order lower than the first predetermined order;

if the maximum difference between the dot products at the vertices is greater than the first threshold value and less than or equal to the second threshold value, selecting the reflection equation of the first predetermined order; and if the maximum difference between the dot products at the vertices is greater than to the second threshold value, selecting the reflection equation of the second predetermined order.

69. The method as set forth in claim 52, wherein said step of selecting comprises the steps of:

determining an eyepoint vector at each vertex;

determining a reflection vector at each vertex, said reflection vector being a vector in the direction light reflects off the surface of the polygon;

determining a dot product of the normal at each vertex and the eyepoint vector at each vertex, and a maximum difference in value between the dot products at the vertices;

comparing the maximum difference between the dot products at the vertices to at least a first threshold value and a second threshold value, said first threshold value indicative of a variation of reflection across the surface of the polygon which requires a reflection equation of at least a first predetermined order to be used, and a second threshold value indicative of a variation of reflection across the surface of the polygon which requires reflection equation of at least a second predetermined order higher than the first predetermined order to be used;

if the maximum difference between the dot products at the vertices is less than or equal to the first threshold value, selecting the reflection equation of a predetermined order lower than the first predetermined order;

if the maximum difference between the dot products at the vertices is greater than the first threshold value and less than or equal to the second threshold value, selecting the reflection equation of the first predetermined order;

if the maximum difference between the dot products at the vertices is greater than the second threshold value, selecting the reflection equation of the second predetermined order.

70. The adaptive shading process of claim 69, wherein the predetermined high order reflection equation to be used is a second order equation.

71. The adaptive shading process of claim 69, wherein if the maximum difference between dot products at the vertices is greater than or equal to the second threshold value, said step of selecting an ordered reflection equation further comprises the substeps of:

determining an eyepoint vector at each vertex and eyepoint vector variation between vertices, said eyepoint vectors being a function of a location of the eyepoint relative to the location of the vertex;

comparing the eyepoint vector variation between vertices to an eyepoint vector threshold value indicative of a large amount of variation eyepoint vectors, if the amount of eyepoint vector variation between vertices is greater than or equal to the eyepoint vector threshold value, selecting the reflection equation of the highest order completing the step of selecting an ordered reflection equation; and the step of determining the maximum variation determines the maximum variation among the curvature variation between vertices, the light vector variation between vertices and the eyepoint vector variation between vertices.

72. The method as set forth in claim 52, wherein; said step of determining comprises the steps of;

determining a light vector at each vertex, said light vector being a function of the normal vector at each vertex and a location of a light source relative to each vertex; and determining a dot product of the normal at each vertex and the light vector at each vertex, and a maximum difference in value between the dot products at the vertices;

said step of comparing comprises the steps of;

comparing the maximum difference between the dot products at the vertices to at least a first threshold value and a second threshold value, said first threshold value indicative of a variation of reflection across the surface of the polygon which requires a reflection equation of at least a first predetermined order to be used, and a second threshold value indicative of a variation of reflection across the surface of the polygon which requires reflection equation of at least a second predetermined order higher than the first predetermined order to be used;

if the maximum difference between the dot products at the vertices is less than or equal to the first threshold value, selecting the reflection equation of a predetermined order lower than the first predetermined order completing the step of selecting an order reflection equation;

if the maximum difference between the dot products at the vertices is greater than the first threshold value and less than an equal to the second threshold value, selecting the reflection equation of the first predetermined order completing the steps of selecting an order reflection equation;

if the maximum difference between the dot products at the vertices is greater than the second threshold value, said step of selecting further comprising the steps of;

determining an amount of curvature variation across the surface of the polygon and a curvature variation between vertices according to normal vectors at the vertices of the polygon;

comparing the amount of curvature variation between the vertices to a curvature threshold value indicative of a large amount of curvature variation, if the amount of curvature variation between vertices is greater than or equal to the curvature threshold value, selecting the highest order reflection equation completing the step of selecting an ordered reflection equation;

determining a light vector variation among vertices;

comparing the light vector variation between vertices to a light vector threshold value indicative of a large amount of variation between light vectors, if the amount of light vector variation between vertices is greater than or equal to the light vector threshold value, selecting the highest order reflection equation completing the step of selecting an ordered reflection equation;

determining a maximum variation among the curvature variation between vertices and light vector variation between vertices; and comparing the maximum variation to a plurality of threshold values which are used to determine the order of the reflection equation to be used, each threshold value delineating a maximum variation value at which reflection equation of a predetermined order can be used to generate a quality image, selecting a reflection equation of a predetermined order if the maximum variation is less than or equal to the threshold value delineating maximum variation at which the reflection equation of the first predetermined order can be used to generate a quality image and greater than the threshold value which delineates maximum variation at which the reflection equation of a predetermined order lower than the first predetermined order can be used to generate a quality image.

73. The method as set forth in claim 52, wherein;
said step of determining comprises the steps of;
determining on eyepoint vector at each vertex, said eyepoint vector being a function of a reflective to the location of the vertex to the location of the eyepoint;

determining a refraction vector at each vertex, said reflection vector being a unit in a direction the light reflects off said surface of said polygon; and determining a dot product of the normal at each vertex and the eyepoint vector at each vertex, and a maximum difference in value between the dot products at the vertices;

said step of comparing comprises the steps of;
comparing the maximum difference between dot products at the vertices to at least a first threshold value and a second threshold value, said first threshold value indicative of a variation of reflection across the surface of the polygon which requires a reflection equation of at least a first predetermined order to be used, and a second threshold value indicative of a variation of reflection across the surface of the polygon which requires reflection equation of at least a second predetermined order higher than the first predetermined order to be used;

if the maximum difference between dot products at the vertices is less than or equal to the first threshold value, selecting a reflection equation of a predetermined order lower than the first predetermined order;

if the maximum difference between dot products at the vertices is greater than the first threshold value and less than or equal to the second threshold value, selecting the reflection equation of the first predetermined order;

if the maximum difference between dot products at the vertices is greater than or equal to the second threshold value, said step of selecting further comprises the steps of;

determining an amount of curvature variation across the surface of the polygon and a curvature variation between vertices according the normal vectors at the vertices of the polygon;

comparing the amount of curvature variation between the vertices to a curvature threshold value indicative of a large amount of curvature variation, if the amount of curvature variation between vertices is greater than or equal to the curvature threshold value, selecting a highest order reflection equation;
determining light vector variation among vertices;

comparing the light vector variation between vertices to a light vector threshold value indicative of a large amount of variation between light vectors, is the amount of light vector variation between vertices is greater then or equal to the light vector threshold value, selecting the highest order reflection equation;

determining the eyepoint vector between vertices;
comparing the eyepoint vector variation vertices to an eyepoint vector threshold value indicative of a large amount of variation between eyepoint vectors, if the amount of eyepoint vector variation between vertices is greater than or equal to the eyepoint vector threshold value, selecting the reflection equation of the highest order;

determining the maximum variation among the curvature variation between vertices, light vector variation between vertices and eyepoint vector variation among vertices; and comparing the maximum variation to a plurality of threshold values which are used to determine an order of the reflection equation to be used, each threshold value delineating a maximum variation at which a reflection equation of a predetermined order can be used to generate a quality image; and selecting a reflection equation of a predetermined order if the maximum variation is less than or equal to the threshold value delineating maximum variation at which the reflection equation of the predetermined order can be used to generate a quality image and greater than the threshold value which delineates maximum variation at which an adjacent reflection equation of a lower order predetermined order can be used to generate a quality image.

* * * * *

UNITED STATES PATENT AND TRADEMARK OFFICE
CERTIFICATE OF CORRECTION

PATENT NO. : 5,253,339
DATED : October 12, 1993
INVENTOR(S) : Wells et al.

It is certified that error appears in the above-indentified patent and that said Letters Patent is hereby corrected as shown below:

In column 30, claim 1 at line 15, please delete " determined " and insert -- determine --.

In column 32, claim 15 at line 68, please delete " ; ".

In column 34, claim 24 at lines 62 and 63, please delete "is the" and insert --is in the--.

In column 36, claim 35 at line 22, please delete " refection " and insert -- reflection --.

In column 44, claim 66 at line 60, please delete " cos $(fy)$=min(a(f), a(y)* cos (y)) " and insert -- cos $(fy)$=min(a(f)*cos(f), a(y)* cos (y)) --.

In column 46, claim 71 at line 31, please delete " variation eyepoint " and insert -- variation between eyepoint --.

UNITED STATES PATENT AND TRADEMARK OFFICE
CERTIFICATE OF CORRECTION

PATENT NO.    : 5,253,339
DATED         : October 12, 1993
INVENTOR(S)   : Wells et al.

It is certified that error appears in the above-indentified patent and that said Letters Patent is hereby corrected as shown below:

In column 47, claim 72 at line 6, please delete " an " and insert -- or --.

In column 47, claim 73 at line 64, please delete " refraction " and insert -- reflection --.

In column 47, claim 73 at line 65, please delete " unit in " and insert -- unit vector in --.

In column 48, claim 73 at line 51, please delete " variation vertices " and insert -- variation between vertices --.

Signed and Sealed this

Twenty-fifth Day of November, 1997

Attest:

BRUCE LEHMAN

Attesting Officer

Commissioner of Patents and Trademarks